United States Patent

Nakajima et al.

[11] Patent Number: 5,822,329
[45] Date of Patent: Oct. 13, 1998

[54] DATA-TRANSMITTER-RECEIVER

[75] Inventors: Kazunori Nakajima, Hadano; Noboru Masuda, Tokorozawa; Tadaaki Isobe, Hadano; Masamori Kashiyama, Isehara; Bunichi Fujita; Masakazu Yamamoto, both of Hadano, all of Japan

[73] Assignee: Hitachi, Ltd., Tokyo, Japan

[21] Appl. No.: 949,783

[22] Filed: Oct. 14, 1997

Related U.S. Application Data

[63] Continuation of Ser. No. 618,787, Mar. 20, 1996, Pat. No. 5,729,550.

[30] Foreign Application Priority Data

Mar. 24, 1995 [JP] Japan ................................. 7-065545

[51] Int. Cl.$^6$ ..................... G06K 5/04; G11B 5/00
[52] U.S. Cl. ................. 371/1; 371/67.1; 371/68.2; 375/354; 375/226; 375/224
[58] Field of Search ................ 371/1, 62, 61, 371/20.1, 67.1, 68.2, 48, 47.1, 5.4; 375/354, 362, 375, 226, 224

[56] References Cited

U.S. PATENT DOCUMENTS

| | | | |
|---|---|---|---|
| 4,301,417 | 11/1981 | Jansen et al. | 375/108 |
| 4,426,713 | 1/1984 | Shimizu et al. | 375/106 |
| 5,524,112 | 6/1996 | Azuma et al. | 370/85.13 |

*Primary Examiner*—Phung M. Chung
*Attorney, Agent, or Firm*—Antonelli, Terry, Stout & Kraus, LLP

[57] ABSTRACT

In transmitting and receiving signals between a plurality of units in a information processing system, signals can be transmitted and received between circuits operated by asynchronous clocks which are the same in period (frequency) but not necessarily to be the same in phase, thereby permitting the information processing system to operate with a shorter clock period. A delay circuit arranged in the communication path is so controllable that the data sent out in synchronism with the clock signal of a transmitting unit is correctly retrieved in synchronism with the clock signal of a receiving unit. Further, data having a predetermined simple pattern is sent out in synchronism with the clock signal of the transmitting unit, and it is decided whether the data has been correctly received by the receiving unit. The delay circuit is automatically controlled by use of the result of decision.

6 Claims, 26 Drawing Sheets

400 PHASE COMPARATOR-CONTROLLER

DATA-TRANSMITTER-RECEIVER

This is a continuation of application Ser. No. 08/618,787, filed Mar. 20, 1996, now U.S. Pat. No. 5,729,550.

BACKGROUND OF THE INVENTION

The present invention relates to a system for transmitting and receiving signals between a plurality of units in an information processing system, or more in particular to an information processing system suitable for the case in which the respective units are operated asynchronously with a single frequency.

With an information processing system comprising a multiplicity of processors operated concurrently, a conventional method for transmitting and receiving data between the processors is known in which data are transmitted and received within a single clock period with an identical frequency and phase of the clock for all the processors in the system. In the case where an attempt is made to improve the performance by reducing the clock period, however, clock phase variations due to the variations in wiring distance from a clock generator to each processor become considerable with respect to the clock period. This conventional method for improving the performance of an information processing system by reducing the clock period therefore has its own limitation.

A method for transmitting and receiving data between processors operated with equal frequency but different phases is disclosed in JP-A-6-025957, for example. In this method, the processor on transmitting side transmits data and a clock signal at the same time. The clock signal thus sent simultaneously with the data is hereinafter called a "piggyback clock". The processor on the receiving side compares the phase of the received piggyback clock with that of the clock signal on the receiving side, and according to the result of the comparison, retrieves the data using proper one of the clock signal and an inverted clock signal. The data thus retrieved is further retrieved with the clock signal on the receiving side, thereby making it possible to retrieve the data correctly. Data transfer thus is possible without being restricted by the clock phase difference between the processors, and therefore a high-performance information processing system with a reduced clock period is realized.

JP-A-6-103881 discloses a system comprising means provided in the unit on the receiving side for changing the delay time in the data route, in which the data passed through the means is retrieved by a flip-flop and a signal slightly delayed from the data is applied to another flip-flop, so that the delay time of the data route is controlled in such a manner that the same data are retrieved by the two flip-flops.

Further, JP-A-6-110575 discloses a system comprising means for measuring the delay time of an LSI constituting the unit on the transmitting side, in which the delay time in the data route is controlled based on the result of measurement.

Furthermore, according to a method disclosed in JP-A-63-305612 for deciding whether the timings of change of two signals are close to or distant from each other, two flip-flops are used, in which one of the flip-flops retrieves the two signals with one of them slightly delayed and the other flip-flop retrieves the two signals with the remaining signal slightly delayed.

SUMMARY OF THE INVENTION

The conventional system described above (i.e., the technique disclosed in JP-A-6-25957) can transmit and receive signals correctly between processors operated with clocks of different phases by using a piggyback clock. In view of the fact that the data signal involves at most one transition every period (from low to high level, or high to low level) while the piggyback clock has two transitions per period (from low to high and further to low level), the signal communication path of the piggyback clock is required to propagate a frequency twice as high as the data signal communication path. Consequently, the high-limit frequency of the clock is reduced.

Also, the data signal may lag behind the piggyback signal on the transmitting side by the delay time of a circuit for sending out data in synchronism with the clock. For this reason or other, the piggyback clock and the data cannot hold exactly the same communication path delay time. The above-mentioned conventional technique using the piggyback signal, therefore, requires a margin equivalent to the delay time difference between the data signal and the clock, thereby limiting the shortening of the clock period.

The object of the present invention is to provide an information processing system operated with a shorter clock period, in which signals can be transmitted and received between circuits operated with clocks of identical period but not always identical phase.

According to one aspect of the invention, there is provided an information processing system, in which a delay circuit inserted in a communication path is capable of being controlled in such a manner that the data sent in synchronism with the clock signal of the processor on the transmitting side is correctly retrieved in synchronism with the clock signal of the processor on the receiving side. Further, the information processing system comprises means for sending data having a predetermined simple pattern in synchronism with the clock signal for the transmitting processor, deciding whether the data is correctly received by the receiving end, and controlling the delay circuit automatically using the result of decision.

According to another aspect of the invention, there is provided an information processing system, in which delay means is controlled by use of the data signal and therefore the maximum frequency of the signal propagated in the communication path may be one half of the frequency required when the piggyback clock is used, i.e., the frequency inherently required for data communication. Further, the delay time of a circuit for sending out a signal in synchronism with the clock on the transmitting side and the set-up time for a retrieving circuit synchronous with the clock on the receiving side can be adjusted with high accuracy due to the fact that a decision circuit has the same circuits. Consequently an information processing system of higher performance is realized with a reduced clock period.

In the technique disclosed by JP-A-6-103881, one of the flip-flops for deciding whether data can be propagated correctly or not is also used for data communication, and the result retrieved at the same timing as the data retrieved by the data communication flip-flop is used for decision. Therefore, in the case where correct data communication is possible in last-minute timing, therefore, correct communication may become impossible midway even in the case where decision on correct communication is made immediately after data communication start. In such a case, it is necessary to interrupt data communication midway and switch the data route, or to reduce the data transmission rate to once for a plurality of clock cycles in order to accommodate a change in retrieve timing which may occur midway. Data therefore cannot be sent at the highest rate of once per clock cycle.

In an information processing system according to the present invention, the data signal retrieved a predetermined time β delayed in synchronism with the receiving clock is compared with the data signal retrieved in synchronism with the receiving clock a predetermined time α delayed, and it is decided whether the time of data signal arrival is close to the clock. In the case where the decision is that the data signal is distant from the clock on the receiving side, it follows that the data signal is distant by more than the range of −α to +β with respect to the clock. As far as the values of α and β are set larger than the delay time change due to noises or the like generated midway of data transmission, correct communication does not become impossible midway of operation. In the information processing system according to the present invention, initialization using a pseudo-data signal permits data to be sent at the highest rate of once per clock cycle without switching the data communication route midway of operation.

With the technique disclosed in JP-A-6-110575, decision is made only with reference to the delay time of the LSI constituting a transmitting unit, and therefore correction is impossible using only the delay time variations of the LSI making up the receiving unit or the clock phase variations.

In the information processing system according to the invention, the data signal retrieved a predetermined time β delayed in synchronism with the receiving clock is compared with the data signal retrieved in synchronism with the receiving clock a predetermined time α delayed, so that decision is made as to whether the time of data signal arrival is close to the clock. In this way, it is possible to correct the variations in total delay time of the LSI making up the transmitting unit, the LSI constituting the receiving unit and the signal communication path connecting the transmitting and receiving units.

JP-A-63-305612 discloses a method for deciding the amount by which timings of two signal are distant from each other, but not any method for data communication.

DESCRIPTION OF THE PREFERRED EMBODIMENTS (1) Embodiment 1

Figure 1:
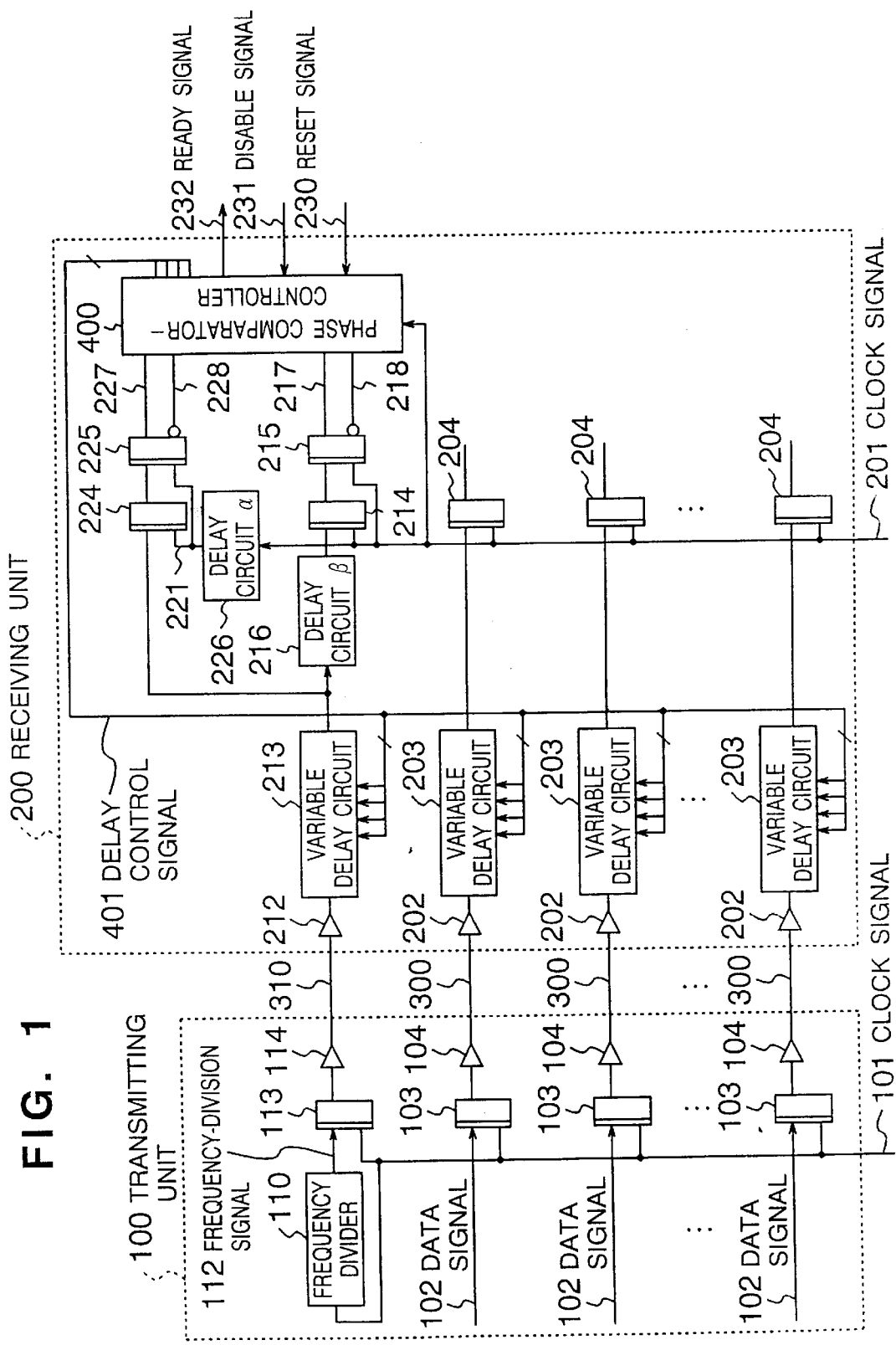
FIG. 1 is a diagram showing a circuit according to an embodiment according to the present invention.

FIG. 1 shows an information processing system according to an embodiment of the invention. In FIG. 1, reference numeral 100 designates a transmitting unit, numeral 200 a receiving unit, numerals 101, 201 clock signals, numerals 103, 113, 204, 214, 215, 224, 225 flip-flops, numerals 104, 114 output buffers, numerals 202, 212 input buffers, and numerals 300, 310 communication paths connecting the transmitting unit 100 and the receiving unit 200.

The transmitting unit 100 is assumed to operate in accordance with the clock signal 101, and the receiving unit 200 is assumed to operate in accordance with the clock signal 201. The clock signals 101 and 201, which are supplied from the same clock source and have the same frequency, are assumed not always to have the same phase due to the delay time variations, etc. of the supply path.

Data are transferred in such a way that the data signals 102 are sent out in synchronism with the clock signal 101 from the transmitting unit 100, and after being propagated to the receiving unit 200 through the communication path 300, are applied to the flip-flops 204 in synchronism with the clock signal 201.

A variable delay circuits 203 are provided for delaying and sending out the output of the input buffers 202 to the input of the flip-flops 204 in such a manner that all the data signals (hereinafter referred to simply as the "data") sent out from the flip-flops 103 in step with the clock signal 101 are applied in step with the clock signal 201 simultaneously.

More specifically, the data phase of the input to the flip-flops 204 has variations with certain temporal width due to the difference in delay time of the communication path 300 or the difference in the driving force of active elements caused by the variations in LSI fabrication. In the case where the phase of the clock signal 201 falls in the time width of the variations, the data advanced in phase may be retrieved in step with the clock signal of the particular period. Data delayed in phase, however, may be retrieved in step with the clock signal of the next period. In such a case, correct data transfer is impossible. The variable delay circuit 203 is provided for delaying all the data by a certain length of time and thus displacing the variation time width from the phase of the clock signal 201. The delay time is controlled through the delay control signal 401 by the phase comparator-controller 400. The control operation is performed in such a manner that the frequency-divided signal 112 output from the frequency-dividing circuit 110 is regarded as pseudo-data and this signal (hereinafter called "frequency division data") is correctly received by the flip-flops 214 and 224.

The communication path from the frequency-dividing circuit 110 to the flip-flop 224 is assumed to have the same configuration as the original communication path for the data signal 102 to proceed to the flip-flop 204. Also, the communication path from the frequency-dividing circuit 110 to the flip-flop 214 is assumed to be configured the same way as the communication path for the data signal 102 to proceed to the flip-flop 204 except that the delay circuit 216 with a delay time β is added to the former. Further, the clock signal used by the flip-flop 214 is assumed to be the same as the clock signal 201 used by the flip-flops 204, and the clock signal used by the flip-flop 224 is assumed to be identical to the clock signal 221 obtained by delaying the clock signal 201 through the delay circuit 226 of a delay time α. The delay circuits 216 and 226 can be configured of an even-numbered inverter stages. The design method for the delay time α and β will be described later with reference to the system operation.

The delay time from the flip-flops 103 to the flip-flops 204 becomes substantially equal to the delay time from the flip-flop 113 to the flip-flop 224, while the delay time to the flip-flop 214 is longer by β.

More specifically, the flip-flop 103 desirably has the same configuration as the flip-flop 113, the output buffer 104 the same configuration as the output buffer 114, the input buffer 202 the same configuration as the input buffer 212, the variable delay circuit 203 the same configuration as the variable delay circuit 213, and the flip-flops 204 the same configuration as the flip-flops 214 and 224. The wiring length and the number of loads between the circuits are preferably designed to be identical to each other as far as possible. Also, the communication paths 300 and 310 preferably have the same conditions including the wiring length.

The flip-flops 215 and 225 are inserted for the purpose of preventing an unstable signal from being transmitted to the phase comparator-controller 400 in the case of a harzard of the flip-flop 214 or 224.

Numerals 230 to 232 designate an interface signal with units for controlling the system as a whole. Numeral 230 designates a RESET signal for initializing the receiving unit 200, numeral 231 a DISABLE signal for stopping the adjusting operation of the phase comparator-controller 400, and numeral 232 a READY signal for notifying completion of the adjusting operation.

Now, the operation of this circuit is explained. The frequency-dividing circuit 110 is assumed to divide the frequency of the clock signal 101 by a factor of eight. The frequency-dividing circuit 112 is sent out in step with he clock signal 101 of the transmitting unit 100, and applied to the receiving unit 200 through the communication path 310. After being passed through the variable delay circuit 213, this signal is split into two parts, one of which is delayed by the delay circuit 216 and applied to the flip-flop 214 in step with the clock signal 201, while the other part of the signal is applied to the flip-flop 224 in step with the clock signal 221.

The flip-flop 215 retrieves the output of the flip-flop 214 in step with the clock signal 201, and applies the output 217 and an inverted output 218 thereof to the phase comparator-controller 400. The flip-flop 225 is supplied with the output of the flip-flop 224 in step with the clock signal 221, and applies the output 227 and an inverted output 228 thereof to the phase comparator-controller 400.

The phase comparator controller 400 compares the outputs 217, 218, 227 and 228 with each other, and decides whether the frequency division data could be retrieved correctly. In the case where the frequency division data could not be retrieved correctly, the delay control signal 401 is modified so that the delay time of the variable delay circuits 203 and 213 is incremented by one step. In the case where the frequency division data could be correctly retrieved, on the other hand, a READY signal is output for notifying complete adjustment.

The operation of the circuit shown in FIG. 1 will be described in more detail with reference to the time charts of FIGS. 2 to 5. FIGS. 2 to 5 show the clock signal 221, the input and output of the flip-flop 224, the input and output of the flip-flop 214 and the input to the flip-flops 204 respectively based on the clock signal 201. The period of the clock signal 201 is designated by T. The lower half part shows a time chart obtained four periods later for the same signal as in the upper half part. The set-up time is assumed to be the same for the flip-flops 204, 214 and 224.

At the rise time of the input to the flip-flops 204 and 224, the variation of the input to the flip-flops 204 relative to the variation of the input to the flip-flop 224 is assumed to be not more than ±γ2. In similar fashion, at the fall time of the input to the flip-flops 204 and 224, the variation is assumed to be not more than ±γ1. Further, the delay time from the rise of the clock signal 101 on the transmitting side to the switching of the input to the flip-flop 224 is assumed to be different by δ from a similar delay time from the fall. FIGS. 2 to 5 represent the case in which the delay for the rise is larger, and the value δ for this case is defined as positive.

The following five cases of phase relationship are considered between the input to the flip-flops 204 and the clock signal 201.

Case 1 (FIG. 2): The rise and fall data are both retrieved in the same clock period (normal state).

Case 2 (FIG. 3): The latest rise lags behind the rear boundary of the clock period.

Case 3 (FIG. 4): The earliest fall runs ahead of the forward boundary of the clock period.

Case 4 (FIG. 5): Neither the rise nor the fall data is laid over the clock period boundary, but the rise and fall belong to different periods (which occurs only when $|δ|>γ1+γ2$).

Case 5 (Not shown): The variations in rise and fall are overlaid in range and the clock period boundaries are included in both the variations.

Correct retrieving of data of the receiving unit 200 is guaranteed only in Case 1. The other cases 2 to 5 represent the opposite cases classified by way of explanation, as described in more detail below with reference to the drawings.

Figure 2:
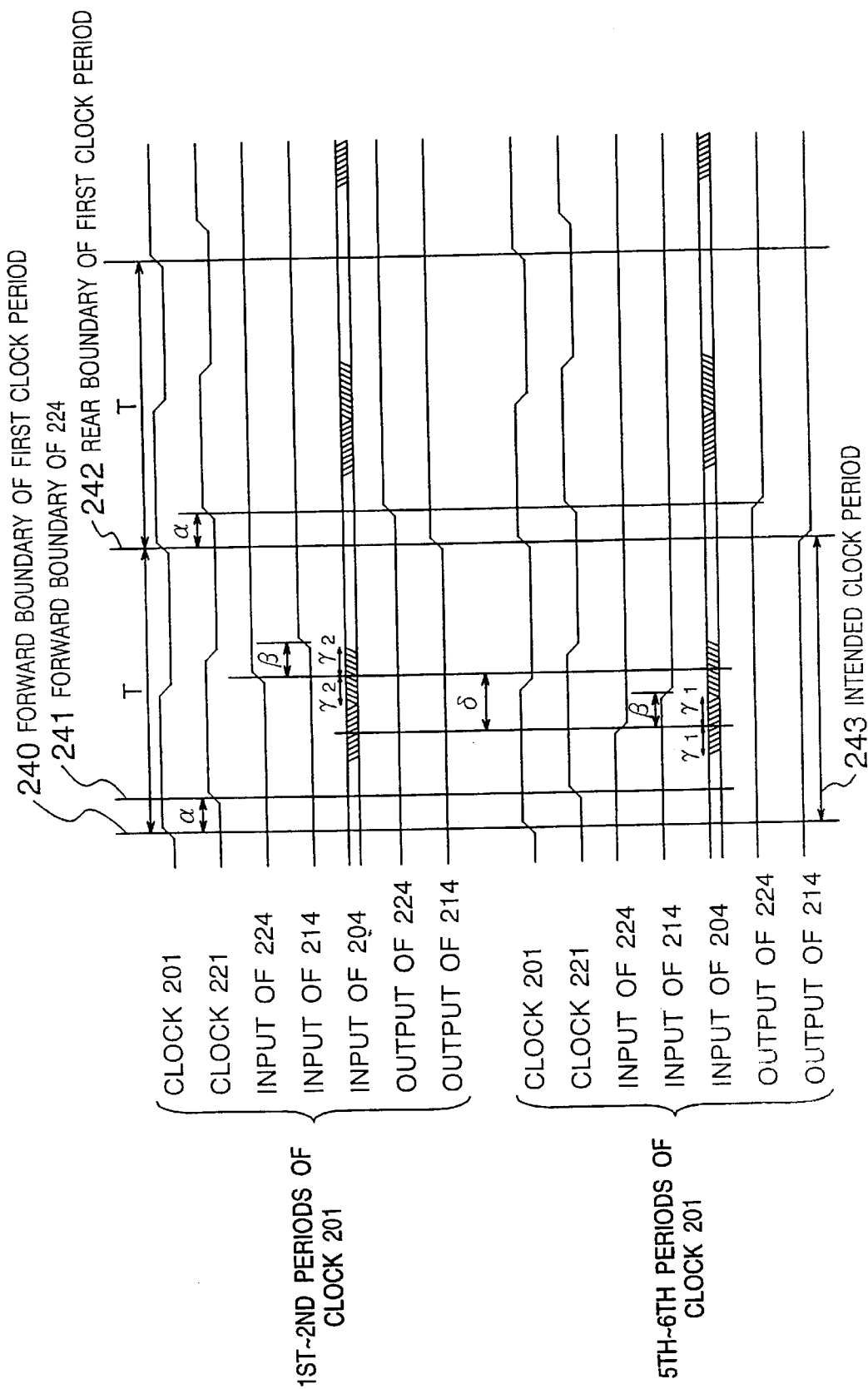
FIG. 2 is a diagram showing an example timing chart representing the circuit operation according to the embodiment of FIG. 1.

FIG. 2 shows an example time chart for Case 1. The latest-arriving signal input to the flip-flops 204 is delayed by $\gamma 2$ behind the rise of the input to the flip-flop 224, while the rise of the input to the flip-flop 214 is delayed by $\beta$. Once $\beta$ is determined to hold the relation $\gamma 2 < \beta$, therefore, the input to the flip-flop 214 is delayed behind any input to the flip-flops 204. As a consequence, unless the input to the flip-flop 214 is delayed behind the rear boundary 242 of the clock period, it is guaranteed that none of the inputs to the flip-flops 204 is delayed behind the rear boundary 242 of the clock period. The design value of $\beta$ is determined to be $$\gamma 2 < \beta^* (1-x) \text{ (*: multiplication)} \qquad \text{Equation 1}$$

taking into consideration that the value $\beta$ changes in the range $(1\pm x)$ due to the fabrication variations.

The value x, which depends on the degree of difficulty or stability of the LSI fabrication processes, normally is considered to be about 20% to 50% for MOS LSI and about 5% to 30% for bipolar LSI.

The earliest-arriving signal of all the inputs to the flip-flops 204 is earlier by $\gamma 1$ than the fall of the input to the flip-flop 224. The clock signal 221 used by the flip-flop 224, on the other hand, is delayed by $\alpha$ behind the clock signal 201 used by the flip-flops 204. Once the value $\alpha$ is determined to hold the relation $\alpha > \gamma 1$, therefore, the time from the forward boundary 241 for the flip-flop 224 to the input to the flip-flops 224 is smaller than the time from the forward boundary 240 of the clock signal to the input to the flip-flops 204. As a result, as long as the input to the flip-flop 224 is not earlier than the forward boundary 241 for the flip-flop 224, it is guaranteed that none of the inputs to the flip-flops 204 is earlier than the forward boundary 240 of the clock period. The design value of $\alpha$ is determined to hold the relation $$\gamma 1 < \alpha^* (1-x) \qquad \text{Equation 2}$$

taking into consideration that the value $\alpha$ changes in the range $(1\pm x)$ due to the fabrication variations. Although FIG. 2 shows the case in which $\delta > 0$, that is, the rise is delayed behind the fall, the following equations are given when $\delta < 0$, that is, the fall is delayed behind the rise.

$$\gamma 1 < \beta^* (1-x) \qquad \text{Equation 1'}$$

$$\gamma 2 < \alpha^* (1-x) \qquad \text{Equation 2'}$$

The values $\alpha$ and $\beta$ are determined in such a manner that Equations 1, 1' and 2, 2' are satisfied for both the rise and fall.

The condition of Case 1 is guaranteed as far as it is confirmed that both the flip-flops 214 and 224 retrieve the rise of the frequency-division data at the clock period 243 with which to retrieve data and also retrieve the fall four periods later with respect to the values $\alpha$ and $\beta$ satisfying Equations 1, 1', 2, 2'. In the case where both the flip-flops 214 and 224 retrieve the frequency-division data at the clock period 243 with which to retrieve data, the output of the flip-flop 214 undergoes a change earlier by $\alpha$ than the output of the flip-flop 224.

Figure 3:
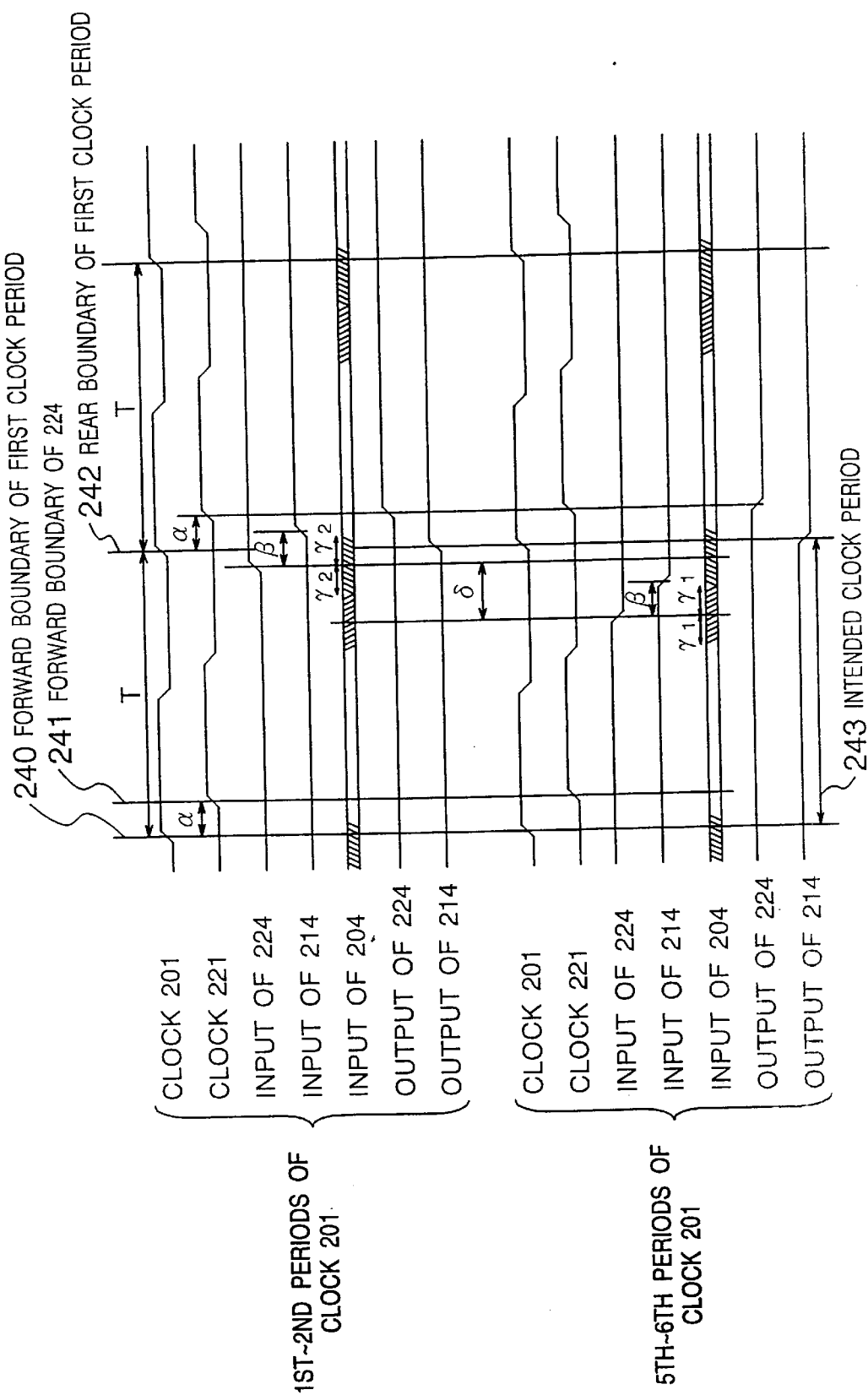
FIG. 3 is a diagram showing an example timing chart representing the circuit operation according to the embodiment of FIG. 1.

FIG. 3 shows an example time chart for Case 2. This diagram represents the case in which the latest-arriving signal of the inputs to the flip-flops 204 is delayed behind the rear boundary 242 of the clock period. Since the rise of the input to the flip-flop 214 is further delayed, the data is not retrieved at the clock period 243 with which to retrieve data. The output of the flip-flop 214, therefore, rises always one period behind the time at which it should otherwise have risen. This can be detected from the fact that the the output of the flip-flop 214 rises later than the output of the flip-flop 224.

Figure 4:
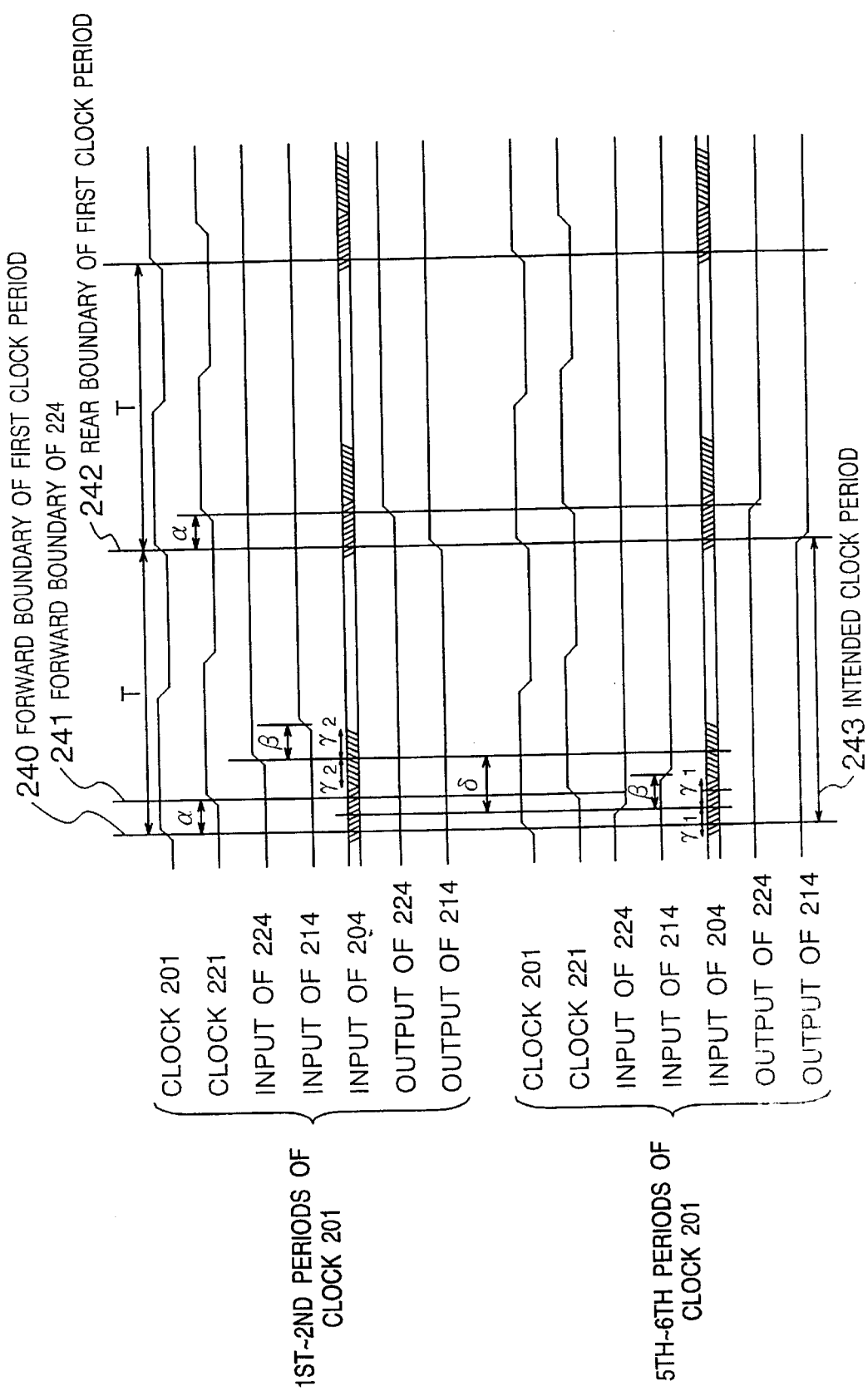
FIG. 4 is a diagram showing an example timing chart representing the circuit operation according to the embodiment of FIG. 1.

FIG. 4 shows an example time chart for Case 3. This diagram represents the case in which the earliest-arriving signal among the inputs to the flip-flops 204 is earlier than the forward boundary 240 of the clock period. Since the fall of the input to the flip-flop 224 is earlier than the boundary 241, the data is retrieved before the clock period 243 with which to retrieve data, so that the output of the flip-flop 224 always falls one period earlier than it should otherwise have fallen. This fact can be detected from the output of the flip-flop 224 falling earlier than the output of the flip-flop 214.

Figure 5:
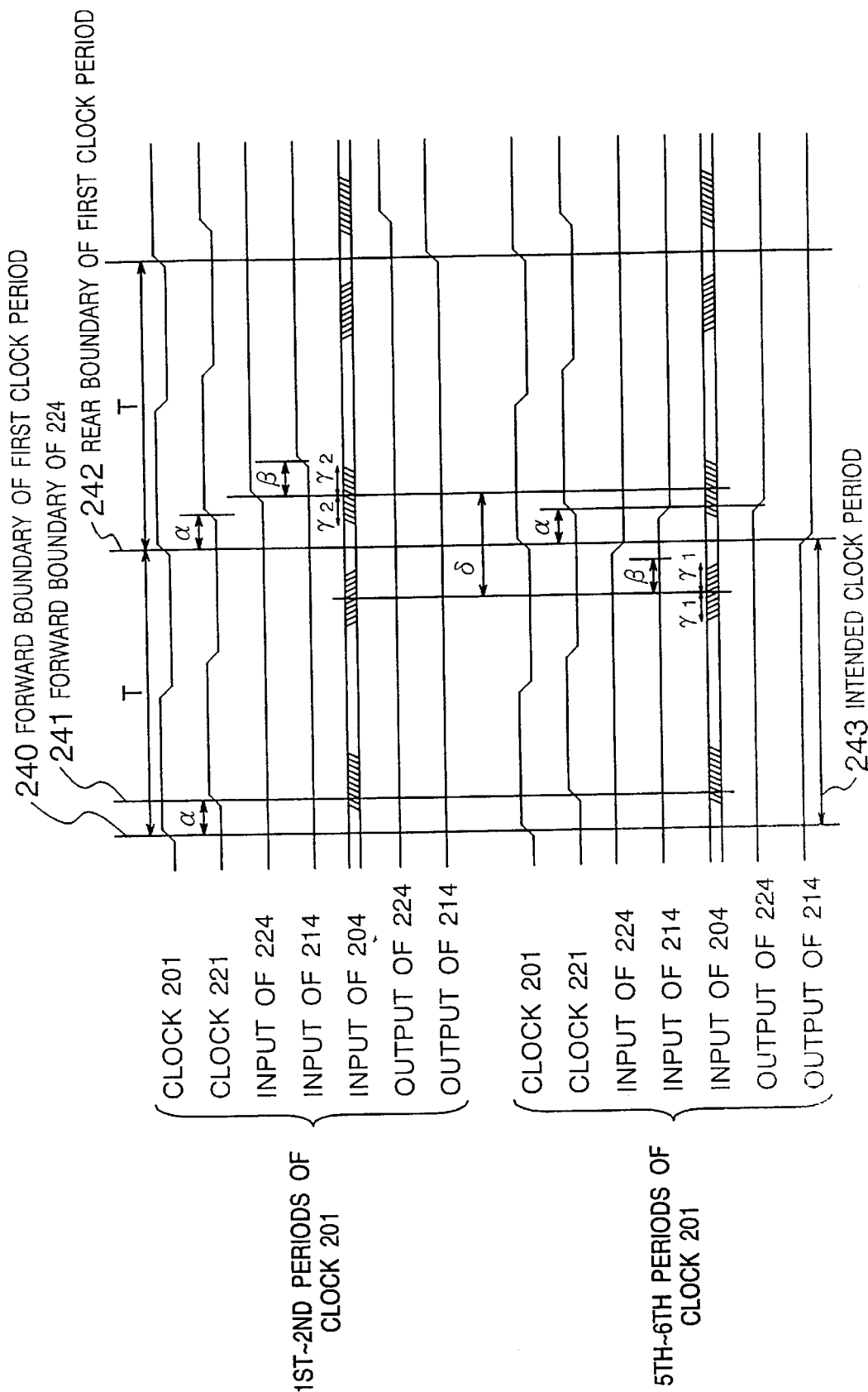
FIG. 5 is a diagram showing an example timing chart representing the circuit operation according to the embodiment of FIG. 1.

FIG. 5 shows an example time chart for Case 4. In the case where $|\delta| > \alpha + \beta$, the rise and fall of the flip-flops 214 and 224 may be separated before and after the boundary 242 of the clock period as shown depending on the phase of the data with respect to the clock 201. In such a case, data is retrieved by the flip-flops 204, 214, 224 one period later than it should otherwise have been retrieved with respect to the rise, but data is entirely retrieved at the original period with respect to the fall. In view of the fact that the output of the flip-flop 214 changes earlier than the output of the flip-flop 224 with respect to both rise and fall, this fact cannot be detected by direct comparison between the outputs of the flip-flops 214 and 224. The time length during which the output of the flip-flops 214 and 224 is at high level (hereinafter expressed as "H") covers three periods of the clock signal 201, and the time length during which the output of the flip-flops 214 and 224 is at low level (hereinafter expressed as "L") represents five periods of the clock signal 201. This fact can be Detected therefore by comparing the output of the flip-flop 224 with the output signal of the flip-flop 214 delayed by four periods.

Case 5 can implemented only in the case where $|\delta| \leq \gamma 1 + \gamma 2$. Case 2 (FIG. 3) concerns the fact that the clock signal boundary is included in the range of rise variations, and Case 3 (FIG. 4) the fact that the clock signal boundary is contained in the range of fall variations, while Case 5 represents the fact that both of the foregoing two cases have occurred. In this last case, detection of the phenomenon is possible by the rise or fall of the output of the flip-flop 224 earlier than the the rise or fall, respectively, of the output of the flip-flop 214.

The foregoing explanation of Cases 1 to 5 assumes that $\delta$ is positive. Nevertheless, the result is similar in the case where $\delta$ is negative. In the case where $\delta$ is negative, however, the rise and fall and the time length of "H" and "L" levels are reversed from the foregoing description.

For Cases 2 to 5, the phase can be changed to the condition of Case 1 by shifting the data collectively using a variable delay circuit as far as the relation holds that $\alpha + \beta + |\delta| < T$. The phase comparator-controller 400 is provided for controlling the degree of this shift. This control operation is performed by comparing the outputs of the flip-flops 214 and 224 with each other and modifying the delay control signal 401 for controlling the variable delay circuit on the basis of the comparison.

Figure 6:
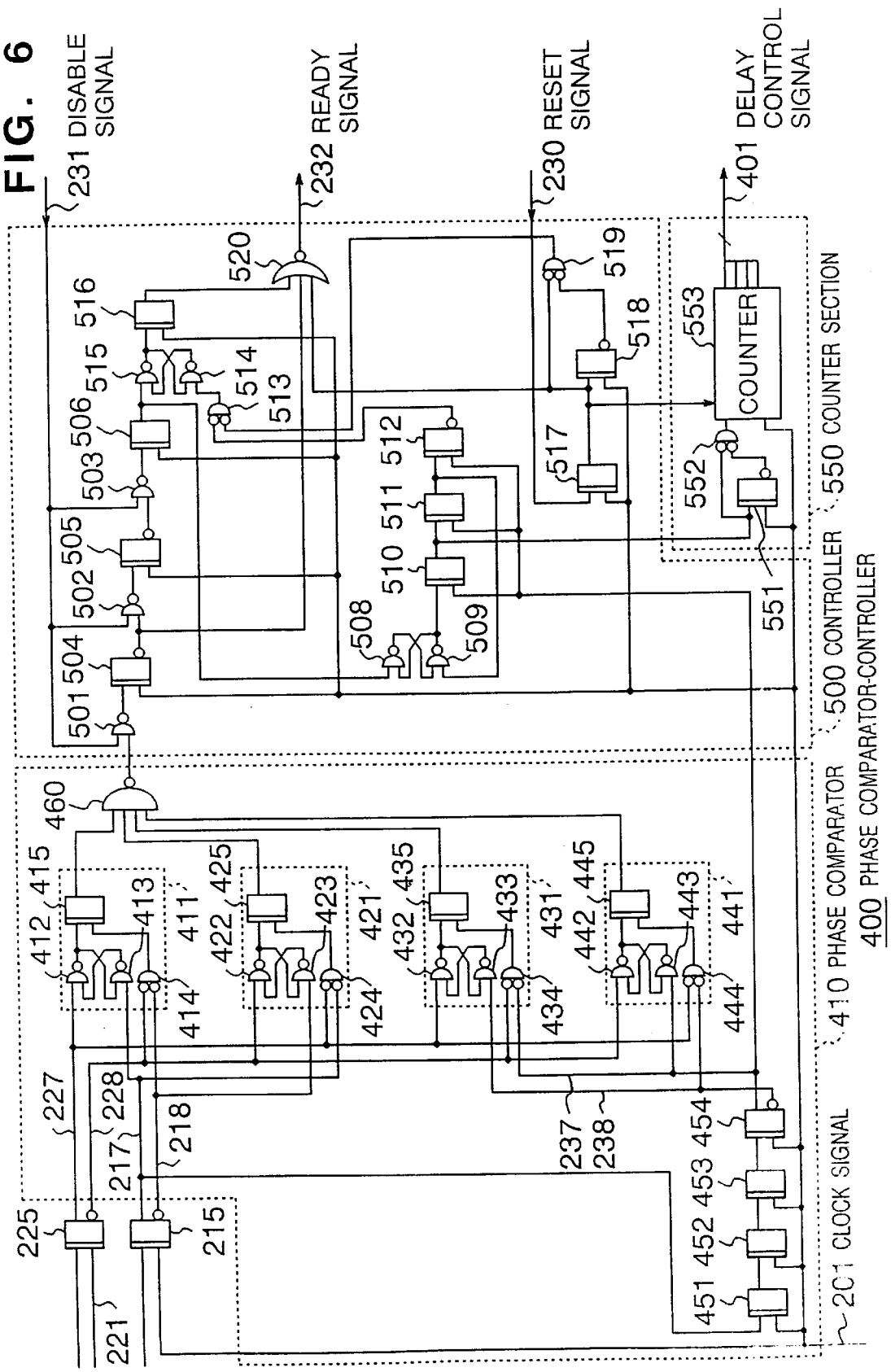
FIG. 6 is a circuit diagram showing a configuration of a phase comparator-controller used for the embodiment of FIG. 1.

FIG. 6 shows the phase comparator-controller 400 according to an embodiment. The phase comparator-controller 400 includes a phase comparator section 410, a controller section 500 and a counter section 550. Numerals 411, 421, 431 designate phase comparators, numerals 415, 425, 435, 445, 451 to 454, 504 to 506, 510 to 512, 516 to 518 and 551 designate flip-flops, and numerals 460, 412 to 414, 501 to 503, 508, 509, 513 to 515, 519, 520 and 552 gate circuits including NAND and NOR. The component parts 412, 413; 508, 509; 514, 515 make up an S-R flip-flop. Numerals 217, 218, 227, 228, 237 and 238 designate data input to the phase comparators. In particular, the signals 217 and 227 are the outputs of the flip-flops 214 and 224 respectively delayed by one period through the flip-flops 215 and 225, the signals 218 and 228 are inverted signals of 217 and 227, the signal 237 is delayed behind signal 217 by four periods further, and the signal 238 is inverted one of the signal so delayed.

First, the configuration of the phase comparator section 410 will be described. The phase comparator section 410 includes phase comparators 411, 421, 431, 441, a gate circuit 460, and flip-flops 451 to 454. Numerals 411, 421, 431 and 441 designate phase comparators having the same configuration for comparing the rise of two signals and outputs the result of comparison. Four comparators are provided for the purpose of causing at least one phase comparator to detect an error in the case where the frequency-division data fail to be correctly retrieved by the receiving unit 200.

More specifically, at least one of the phase comparators 411 and 421 is adapted to detect an error in Case 2, 3 or 5, and at least one of the phase comparators 431 and 441 is provided for detecting an error in Case 4. Upon detection of an error by at least one of the phase comparators, the detection signal is sent to the controller 500 through the gate 460. The flip-flops 451 to 454 are configured to shift the output of the flip-flop 215 by four periods of the clock signal 201 (i.e., one half period of the frequency-division signal 112).

Now, the operation of the phase comparator section 410 will be explained. The phase comparators 411, 421, 431 and 441 are each supplied with four signals, decides which rise of the upper two signals in the drawing is earlier, and produces the result of decision as an output.

The operation of the phase comparator section 410 will be described more specifically taking the phase comparator 411 as an example. NANDs 412 and 413 make up an S-R flip-flop with the NAND 412 as an output. When inputs to the NANDs 412 and 413 external to the phase comparator are both "L", the outputs of the NANDs 412 and 413 are both fixed to "H". When one of the external inputs becomes "H", however, the inputs to the NAND supplied with an external "H" signal both become "H" and therefore the output thereof assumes "L". This output remains unchanged even when the other external input becomes "H" subsequently. The inputs to a NOR 414, on the other hand, is supplied with inverted signal 218, 228 of the two inputs 217, 227 of the NANDs 412 and 413. When both the two inputs to the NANDs 412 and 413 assume "H", therefore, the inputs to the NOR 414 become both "L", and the output of the NOR 414 rises. The flip-flop 415 retrieves the output of the NAND 412 in step with the rise of the NOR 414.

Consequently, in the case where the input to the NAND 413 of all the signal inputs external to the phase comparator rises earlier than the input to the NAND 412, the flip-flop 415 outputs a "H" signal. Conversely, in the case where the input to the NAND 412 rises earlier than the input to the NAND 413, the flip-flop 415 outputs "L". If the circuit is connected in such a manner that the input to the NAND 413 rises earlier than the input to the NAND 412 under normal conditions, the "L" output of the flip-flop 415 assumes an error signal.

The remaining phase comparators operate in similar fashion and are connected to produce a "H" signal under normal conditions.

Now, the operation of the phase comparator 410 will be explained in more detail with reference to the time charts of FIGS. 7 to 13. FIGS. 7 to 13 show data 217, 218, 227, 228, 237 and 238 input to the four phase comparators and outputs of the flip-flops 415, 425, 435 and 445 on the basis of the clock signal 201.

First, explanation will be made about the fact that all the phase comparators output a "H" signal under normal conditions of Case 1 as described with reference to FIG. 2.

Figure 7:
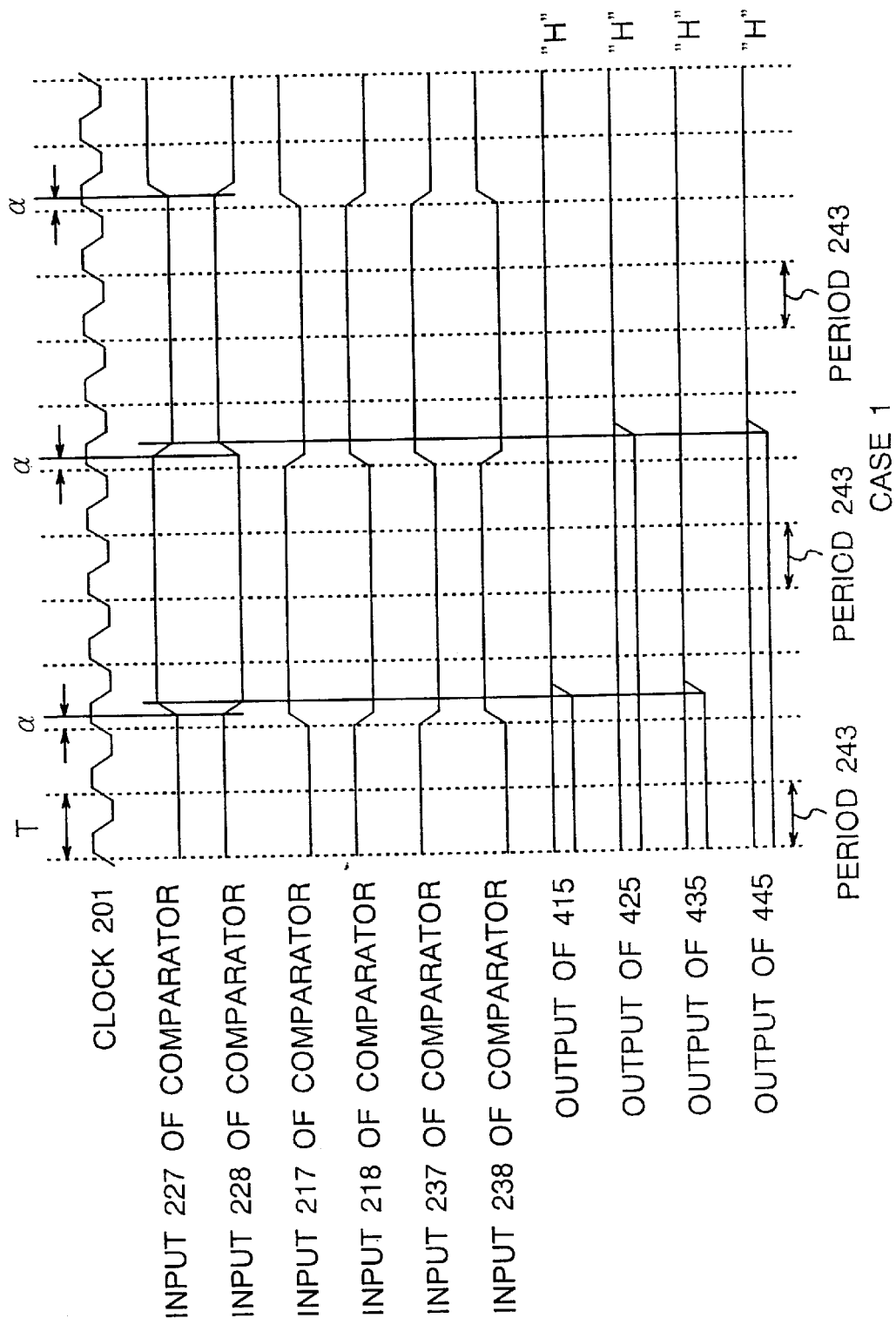
FIG. 7 is a diagram showing an example timing chart representing the circuit operation of the phase comparator of FIG. 6.

FIG. 7 shows an example time chart for Case 1. The initial values of the flip-flops 415, 425, 435 and 445 are determined by the result of previous phase comparison. The initial values, therefore, are assumed to be fixed to "H" or "L" until the timing of first phase comparison on the shown time chart. The phase relation of the data input to the phase comparator is normal, and therefore the flip-flops 214 and 224 retrieve the data at the intended clock period 243, and the flip-flops 215 and 225 retrieve the outputs of the flip-flops 214 and 224 respectively at the next period. The phase comparator 411 applies the output 227 of the flip-flop 225 to the NAND 412, and the output 217 of the flip-flop 215 to the NAND 413. The output signal 217 rises, followed by the rise of the output signal 227 the time length α later. The phase relation between data input to the phase comparator 411, therefore, is normal. Simultaneously with the fall of the inverted output 228 of the flip-flop 225, both the signals 218 and 228 become "L". The output of the flip-flop 415, therefore, is established at "H". The output after establishment of the flip-flop is shown to the extreme right in the time chart.

The phase comparator 421 applies the inverted output 228 of the flip-flop 225 to the NAND 422 and the inverted output 218 of the flip-flop 215 to the NAND 423. The signal 218 rises, followed by the rise of the signal 228 the time length α later, and therefore the phase relation of the data input to the phase comparator 421 is normal. Simultaneously with the fall of the output 227 of the flip-flop 225, the signals 217 and 227 both assume a "L" level. Hence, the output of the flip-flop 425 is established at "H".

The phase comparator 431 applies the output 227 of the flip-flop 225 to the NAND 432, and the inverted output 238 of the flip-flop 454 to the NAND 433. The signal 238 rises, followed by the rise of the signal 227 the time length α later, so that the phase relation of data applied to the phase comparator 431 is normal. Simultaneously with the fall of the inverted output 228 of the flip-flop 225, the signals 228 and 237 both assume "L", and therefore the output of the flip-flop 435 is established at "H".

The phase comparator 441 applies the inverted output 228 of the flip-flop 225 to the NAND 442, and the output 237 of the flip-flop 454 to the NAND 443. The signal 237 rises, followed by the rise of the signal 228 the time length α later. The phase relation of data input to the phase comparator 441 therefore is normal. Simultaneously with the fall of the output 227 of the flip-flop 225, the signals 227 and 238 both assume "L", and therefore the output of the flip-flop 445 is established at "H".

Now, explanation is made about the fact that at least one of the flip-flops of the phase comparators 411 and 421 outputs a "L" and detects a fault in the case where the boundaries of the clock period are included in the range of variations of the rise or fall of the data for Case 2 or 3.

Figure 8:
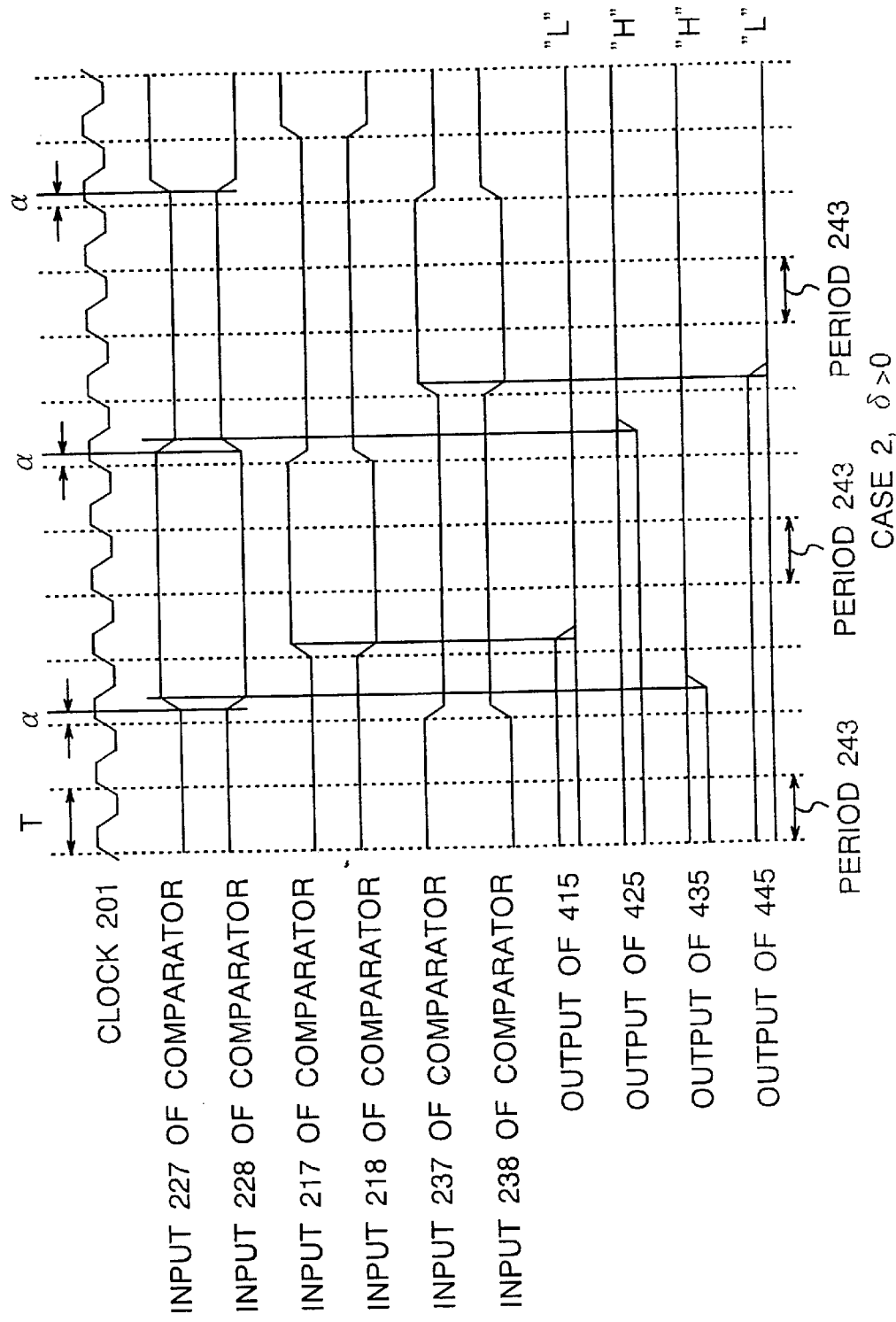
FIG. 8 is a diagram showing an example timing chart representing the circuit operation of the phase comparator of FIG. 6.

FIG. 8 shows an example time chart for Case 2 in which δ>0. The main difference of this case from a normal Case 1 is that the rise of the signal 217 occurs one period later than it should otherwise occur. The sequence of rise of the signals 217 and 227 is thus reversed, and the output of the flip-flop 415 is established at "L" as an error.

Figure 9:
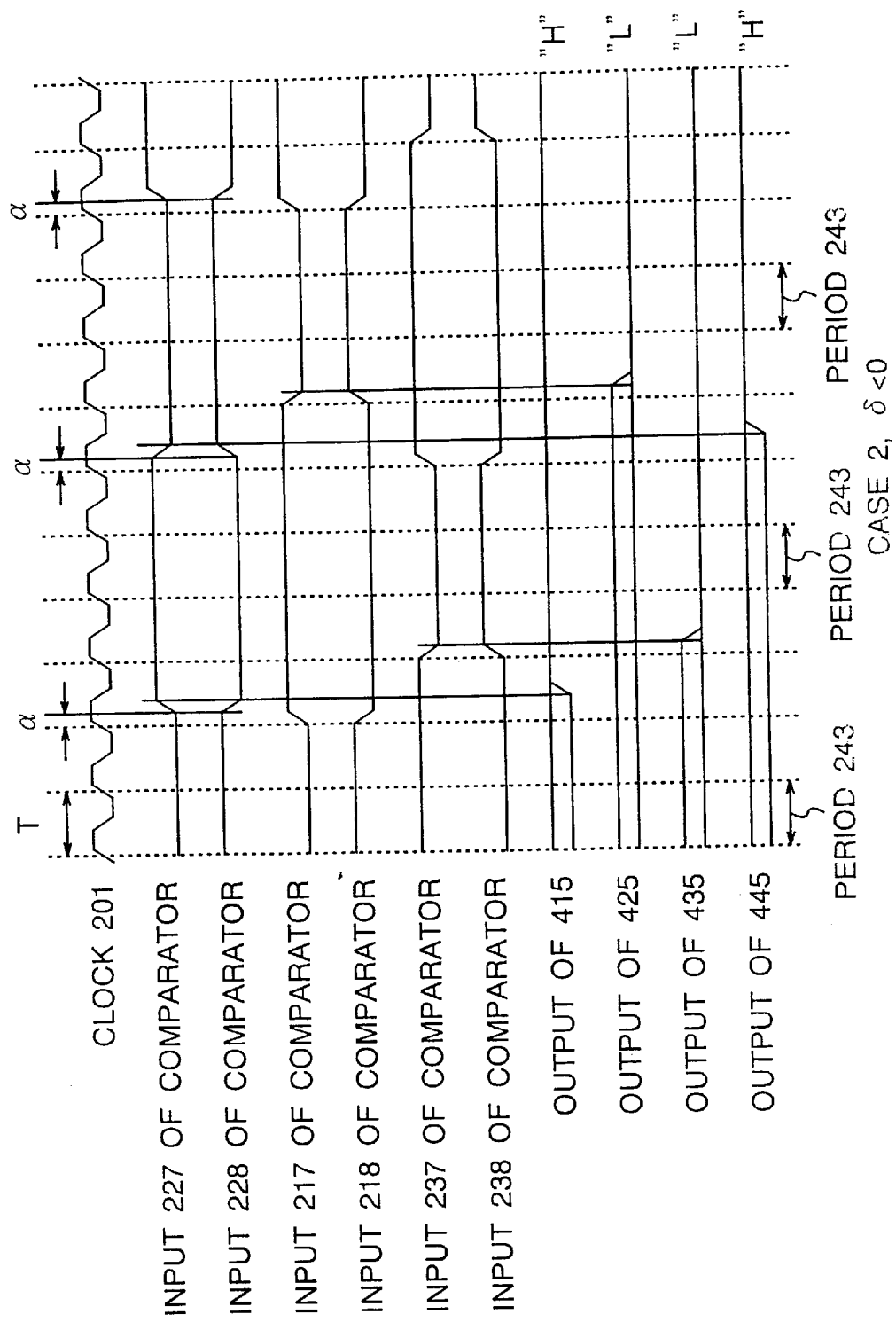
FIG. 9 is a diagram showing an example timing chart representing the circuit operation of the phase comparator of FIG. 6.

FIG. 9 shows an example time chart for Case 2 in which δ<0. This case is different from the normal Case 1 mainly in that the rise of the signal 218 is delayed one period than normal. The sequence of the rises of the signals 218 and 228 is thus reversed. The output of the flip-flop 425 is established at "L" indicating an error.

Figure 10:
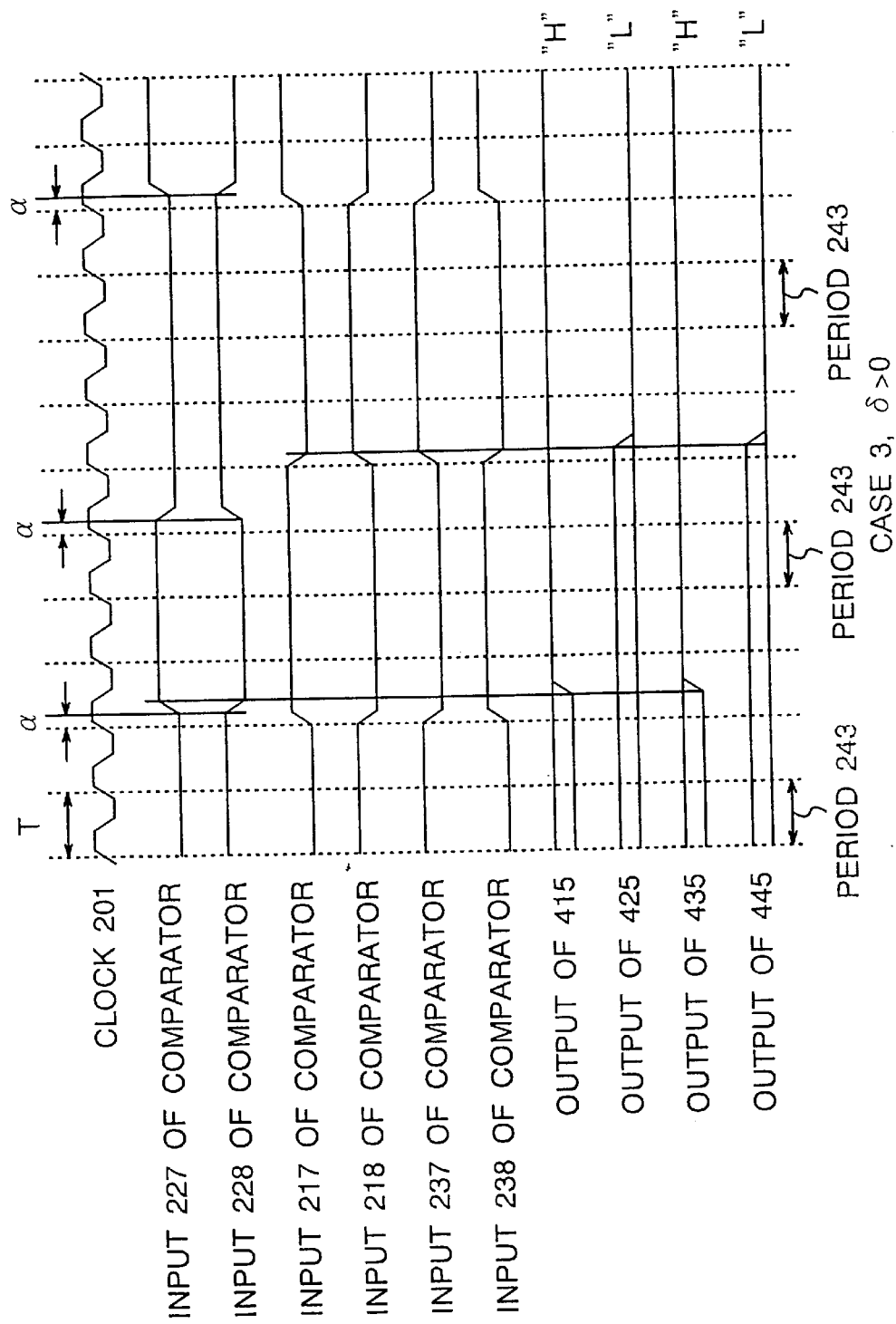
FIG. 10 is a diagram showing an example timing chart representing the circuit operation of the phase comparator of FIG. 6.

FIG. 10 shows an example time chart for Case 3 in which δ>0. The difference from normal Case 1 is that the rise of the signal 228 occurs one period earlier than normal. As a result, the sequence of rise of the signals 218 and 228 is reversed, so that the output of the flip-flop 425 is established at "L" as an error.

Figure 11:
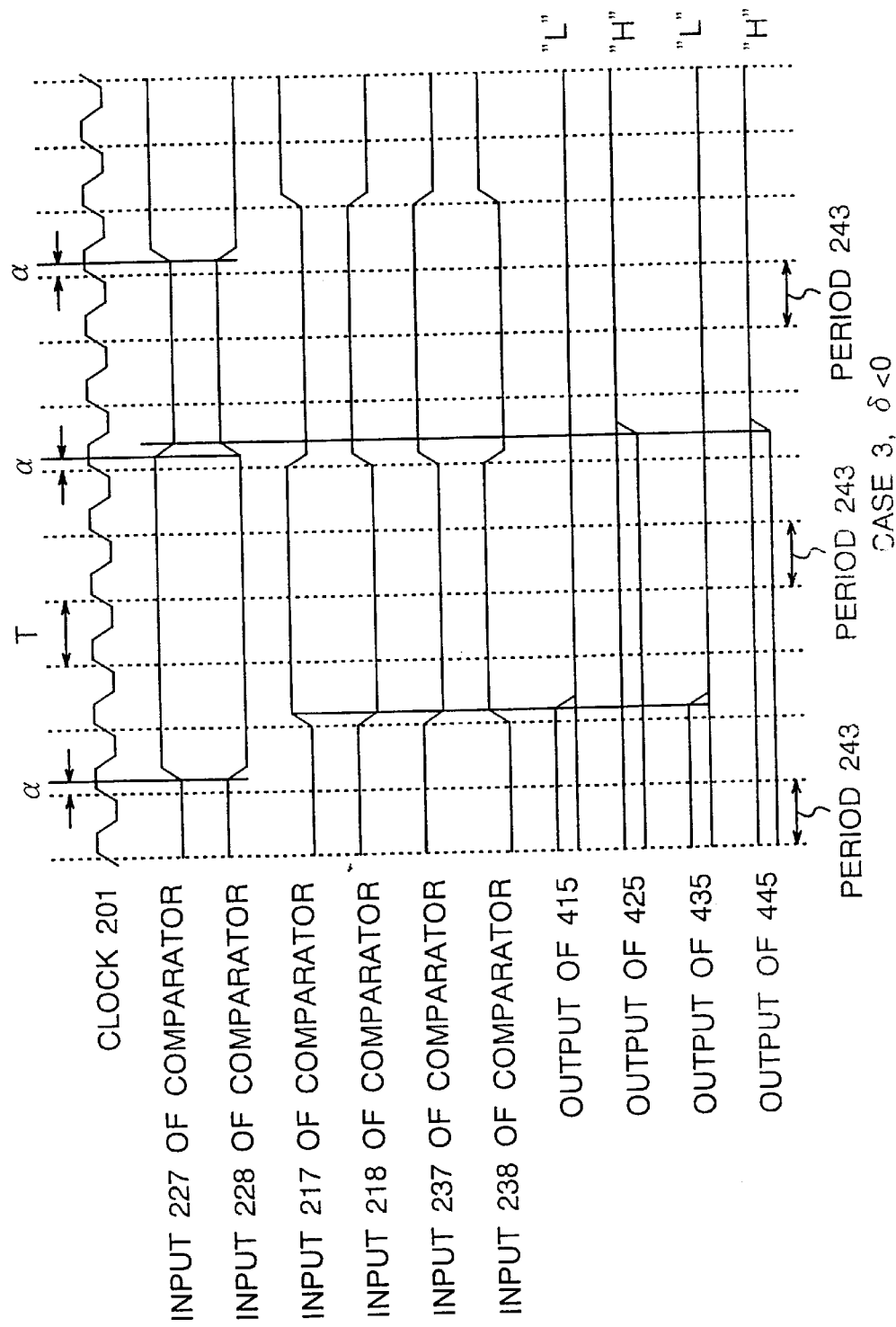
FIG. 11 is a diagram showing an example timing chart representing the circuit operation of the phase comparator of FIG. 6.

FIG. 11 shows an example time chart for Case 3 where δ<0. The main difference of this case from the normal Case 1 lies in that the rise of the signal 227 occurs one period earlier than normal. The sequence of rise of the signals 217 and 227 is thus reversed so that the output of the flip-flop 415 is established at "L" as an error.

Now, explanation will be made about the fact that the phase comparators 411 and 421 are unable to detect a fault but the flip-flop of the phase comparator 431 or 441 detects a fault by outputting a "L" in Case 4 where the rise and fall of data are included in different periods.

Figure 12:
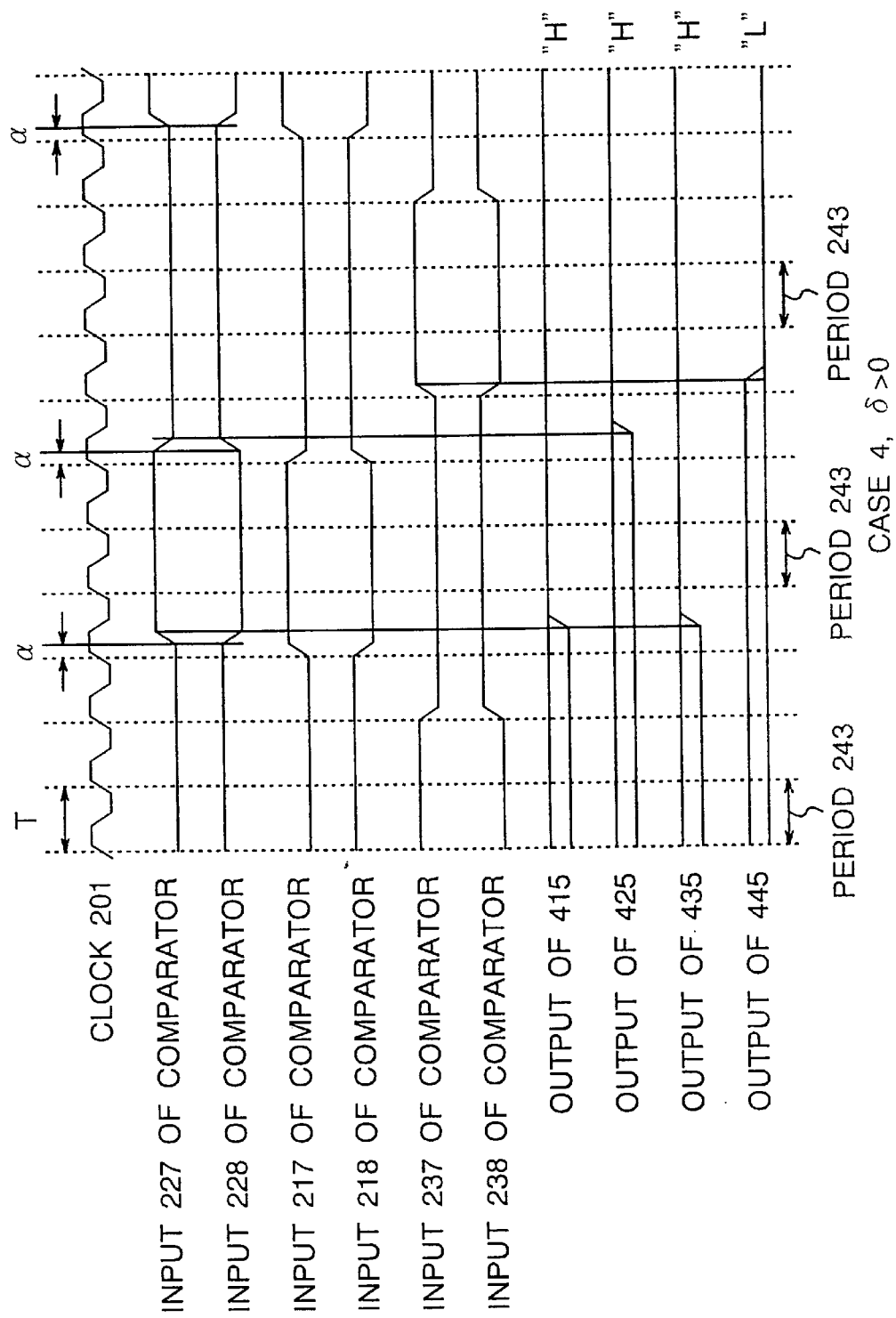
FIG. 12 is a diagram showing an example timing chart representing the circuit operation of the phase comparator of FIG. 6.

FIG. 12 shows an example time chart for Case 4 where δ>0. The main difference of this case from the normal Case 1 is that both the signals 217 and 227 fall one period later than normal. As a consequence, the sequence of rise of the signals 217 and 227 is conserved, so that the inputs to the phase comparators 411 and 421 are normal and the flip-flops 415 and 425 output "H". The output of the flip-flop 237, which is shifted by 4 periods from the signal 217, however, rises one period later than normal. The sequence of rise of the signals 228 and 237 thus is reversed, so that the output of the flip-flop 445 is established at "L" as an error.

Figure 13:
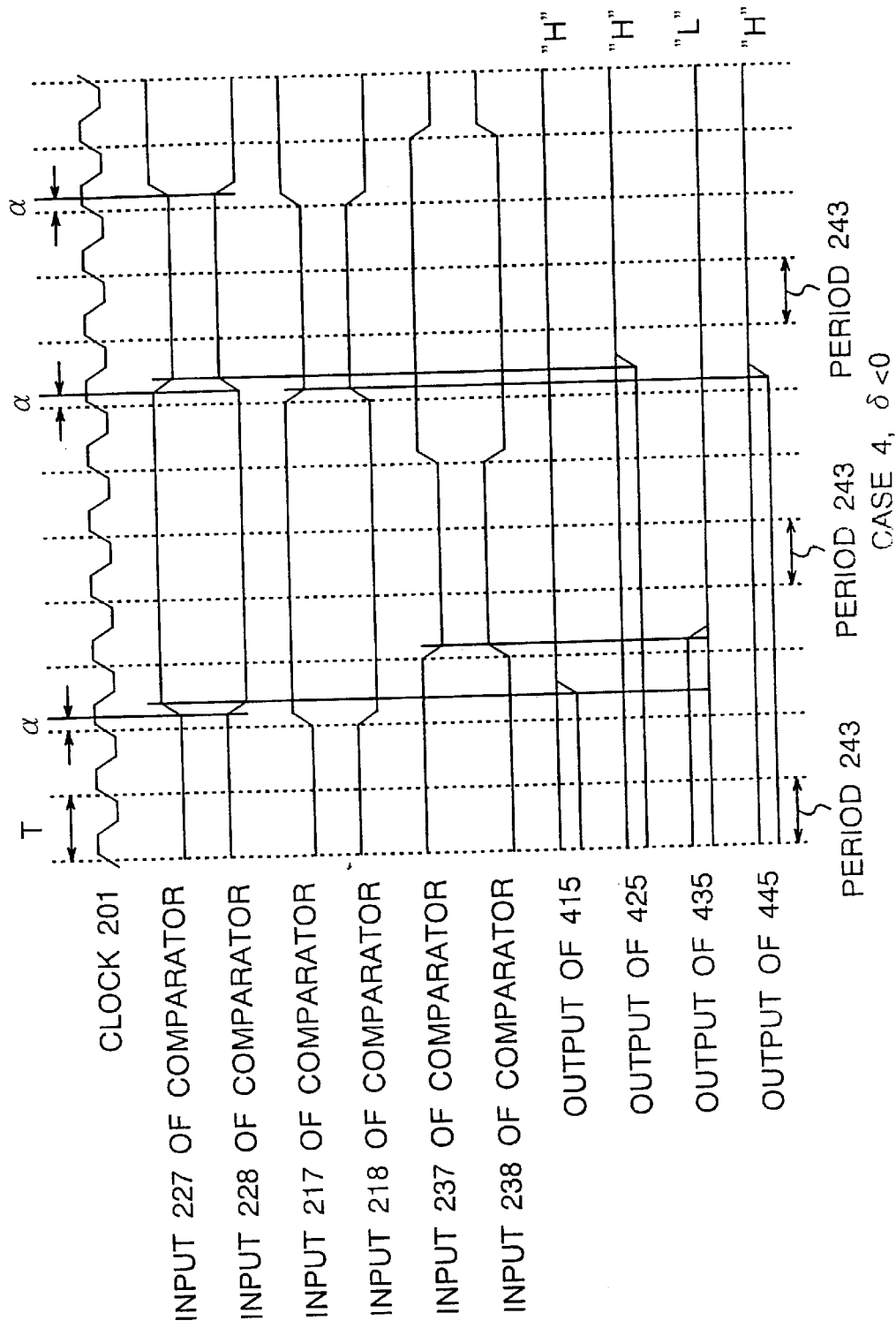
FIG. 13 is a diagram showing an example timing chart representing the circuit operation of the phase comparator of FIG. 6.

FIG. 13 shows an example time chart for Case 4 where δ<0. The main difference of this case from the normal Case 1 lies in that the rise of both the signals 218 and 228 occurs one period later than normal. As in the case where δ>0, the inputs to the phase comparators 411 and 421 are normal, and the flip-flops 415 and 425 output "H". However, the output of the flip-flop 238 is shifted by 4 periods from the signal 218, and therefore rises one period later than normal. Consequently, the sequence of rise of the signals 218 and 238 is reversed and the output of the flip-flop 435 is established at "L" as an error.

Finally, Case 5 will be explained. The input to the phase comparator for Case 5 can be considered in such a way that the fall of the signals 217 and 237 is delayed one period and the rise of the signals 218 and 238 is delayed one period in FIG. 8. In addition to the reversal of sequence of rise of the signals 217 and 227, the sequence of rise of the signals 218 and 228 is also reversed, so that the outputs of both the flip-flops 415 and 425 are established at "L" as an error.

Now, a configuration of the controller section 500 and the counter section 550 in the circuit of FIG. 6 will be explained.

Flip-flops 504 to 506 are configured to retrieve a signal in step with the clock signal 201 and apply the error signal from the phase comparator 410 to the controller section 500. Gate circuits 501 to 503 connected in the first stage of the flip-flops 504 to 506 respectively are provided for stopping the transition of the delay control signal 401 by fixing the input signals to the flip-flops 504 to 506 using a DISABLE signal 231.

A flip-flop 510 is connected to the counter section 550 in such a way that the count on the counter section 550 is incremented by one when the flip-flop 510 outputs an error signal. The flip-flop 551 and the NOR 552 are so configured as to be activated and generate a pulse of one clock width at the fall of the error signal output from the flip-flop 510. The counter 553 is a circuit activated by the same pulse signal as above, and thus increments the delay control signal 401 by one count and holds the count.

An S-R flip-flop including NANDs 514 and 515 is installed for the purpose of outputting a READY signal 232 after complete correction of the delay control signal 401. The gate circuit 520 is supplied with the output of the flip-flop 516, the inverted output of the flip-flop 504 and the output of the flip-flop 517, and outputs the READY signal 232.

The signal output from the flip-flop 517 to the counter 553 is for initializing the count on the counter 553 to "0" upon receipt of a RESET signal.

Now, the operation of the controller section 500 and the counter section 550 will be explained.

In the case where the clock signal 201 is applied for several cycles with the RESET signal 230 and the DISABLE signal 231 at "H", the output of the flip-flop 517 assumes "H" and the output of the flip-flop 518 "L", with the count on the counter 553 becoming "0". In the process, the outputs of the flip-flops 504 and 505 are "L" and the output of the flip-flop 506 "H" when the output of the NAND circuit 460 is "L", i.e., in the absence of an error. Then, the outputs of the flip-flops 510 and 511 become "H" several cycles later.

In other words, the output of the flip-flop 509 is "H" and the output of the 508 becomes "L" if the output of the flip-flop 511 is "L". Subsequently, as far as the output of the flip-flop 506 is not "L", the output of the flip-flop 508 is kept at "L" and the output of the flip-flop 509 at "H". The outputs of the flip-flops 510, 511 become "H" several cycles later.

Upon detection of an error, however, the output of the flip-flop 460 becomes "H", and after three cycles, the output of the flip-flop 506 becomes "L" and the output of the flip-flop 508 "H". Then, the output of the flip-flop 511 is reversed at the flip-flop 509 and applied to the flip-flop 510.

The clock terminals of the flip-flops 510 to 512 are supplied with a frequency-divided signal 112 divided by eight at the frequency divider 110 in the transmitting unit 100 and output from the flip-flop 454 through a multiplicity of flip-flops and the like. The output of the flip-flop 509 therefore is applied to the flip-flop 510 eight periods later, and further to the flip-flop 511 another eight periods later. This last signal is inverted at the flip-flop 509, and therefore the outputs of the flip-flops 509 to 512 are subjected to transition at a period 32 longer than the clock signal.

With the transition of the output of the flip-flop 510, the fall of the signal activates the circuit including the flip-flops 551 and 552 to output a pulse of one clock width, which pulse is applied to the counter 553. After that, the RESET signal 230 is reduced to "L" to cancel the reset condition. The count on the counter 553 is incremented by one for each 32 cycles, and the result of incrementation is applied to the variable delay circuits 203 and 213 through the delay control signal 401. The count is incremented one by one until the error is removed, while at the same time the delay time of the variable delay circuits 203 and 213 increases little by little.

When the condition of Case 1 of FIG. 7 is reached, the error is removed, so that the output of the flip-flop 460 becomes "L" and the output of the flip-flop 506 becomes "H". When the output of the flip-flop 509 becomes "H" subsequently, the output of the flip-flop 508 becomes "L", so that the outputs of the flip-flops 501 to 509 remain unchanged unless an error is detected again. The outputs of the flip-flops 510 to 512 are also held sequentially.

The rate of count change was defined to be one count for each 32 cycles because of the need to secure a sufficient time before the result of delay time change is reflected in the result of phase comparison.

The READY signal 232 becomes "H" after the lapse of at least 8 cycles from the cancellation of the RESET signal 230, disappearance of the error signal and complete phase adjustment.

More specifically, during the time when the RESET signal 230 is "H", the output of the flip-flop 517 is "H". If an error condition occurs during this time, the outputs of the flip-flops 504, 515, 516 are all "H". After that, the RESET signal 230 becomes "L", and after a further lapse of sufficient time, the output of the flip-flop 512 inverts the output of the flip-flop 515. When this signal is retrieved by the flip-flop 516, the READY signal 232 becomes "H". When the DISABLE signal 231 is reduced to "L" in response to the rise of the READY signal 232 to "H", the delay control signal 401 remains unchanged subsequently even if an error is detected.

Once the delay time α and β of the delay circuits 226 and 216 are set sufficiently large as compared with the delay time variations γ1 and γ2 of the communication path, the data signal 102 can be regarded to be transmitted normally even when an error is detected occasionally after complete adjustment.

Figure 14:
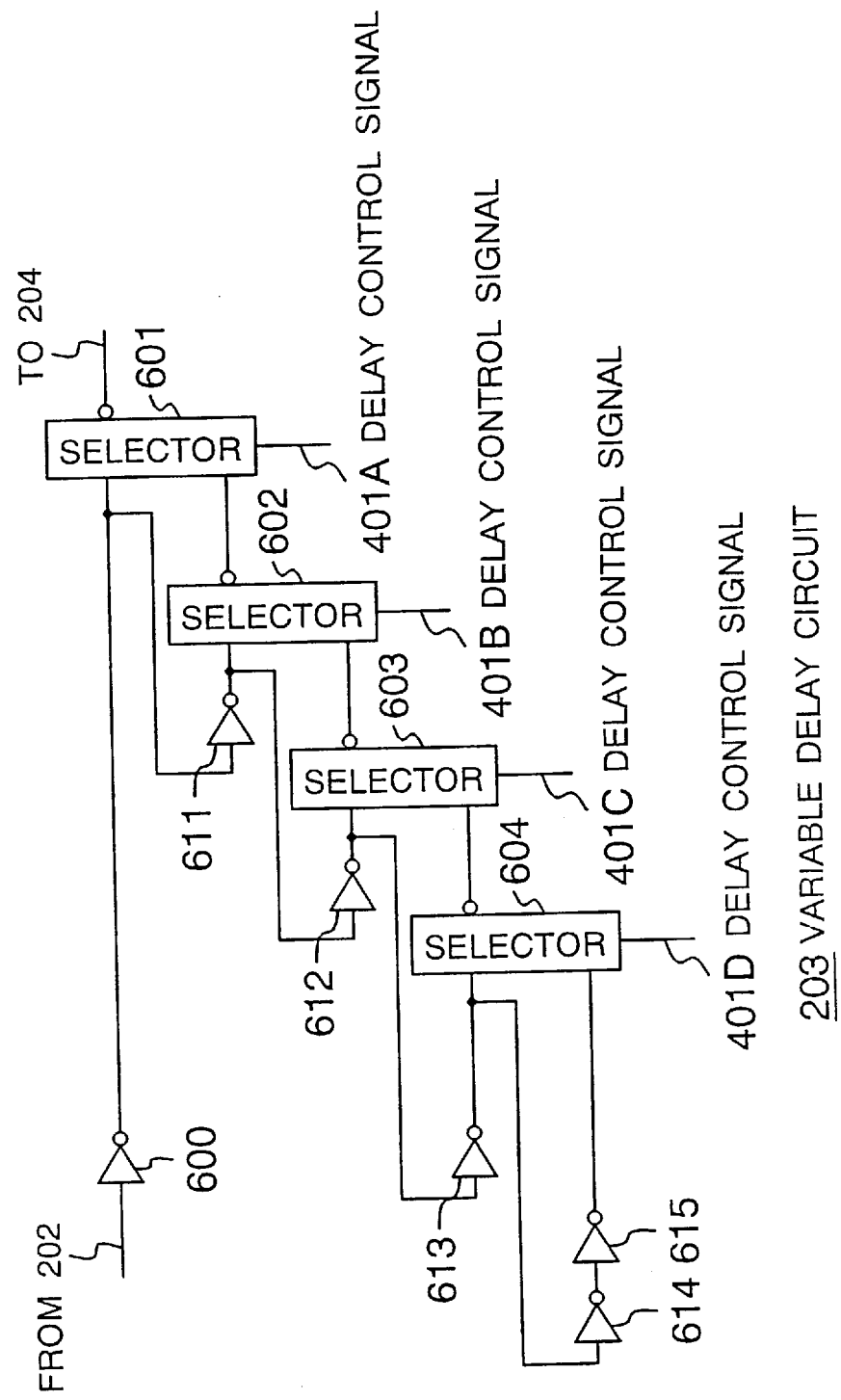
FIG. 14 is a circuit diagram showing a configuration of a variable delay circuit used for the embodiment of FIG. 1.

The variable delay circuits 203 and 213 may be configured of the circuit disclosed in JP-A-6-97788 filed by our company, for example. An example of such circuit is shown in FIG. 14. A buffer 600 is for receiving an output from an input buffer 202. Gate circuits 611, 612, 613, 614 and 615 are connected to delay the data signal respectively. The lower input to each of the selectors 601, 602, 603 and 604 is more delayed than the upper input thereto respectively by a time equivalent to the duration required to pass through an adjacent selector respectively. In the case where the delay control signals 401A, 401B, 401C and 401D are "L", for example, the selectors 601 to 604 select the upper input with smaller delay and outputs an inverted signal thereof. When the delay control signals 401A, 401B, 401C and 401D are "H", in contrast, the selectors 601 to 604 select the lower input with a larger delay time respectively and outputs an inverted signal thereof. The delay time before the data signal received by the buffer 600 is output from the selector 601 can be changed by changing the delay control signals 401A, 401B, 401C and 401D. In other words, the delay time is largest when the delay control signals 401A, 401B, 401C and 401D are all "H" and all the selectors select the lower input in the drawing. The delay time is reduced progressively as the delay control signals 401D, 401C, 401B and 401A turn to "L" in that order, the delay time being minimum when all the delay control signals are in "L" state.

An example design method of the variable width A and the resolution S of the variable delay circuits 203 and 213 is described. First, the total sum of the change of delay time due to the jitter width of the clock signal 201 and the temperature change of the signal communication path is assumed to be ΔT.

A method of determining the variable width A will be explained with reference to FIG. 3. The variable width A is required to be large enough to allow the data to be shifted collectively to the phase assuring the retrieval of the data at the next period in the case where the retrieval of the last-arriving input to the flip-flops 204 at the intended period ceases to be assured.

The first phase mentioned above refers to the case in which the inputs to the flip-flops 204, 214 and 224 of FIG. 3 are shifted slightly forward collectively until the rise of the input to the flip-flop 214 comes to coincide with the rear boundary 242 of the clock period. Under this condition, the fall of the input to the flip-flop 224 is located $(\beta+|\delta|)$ in advance of the flip-flop 242. The second phase represents the case in which the inputs to the flip-flops 204, 214 and 224 of FIG. 3 are collectively shifted backward until the fall of the input to the flip-flop 224 comes to coincide with a point located a behind the boundary 242.

The total sum of the phase to be shifted therefore is given as $(\alpha+\beta+|\delta|)$, and the variable width is required to be larger this value. Taking into consideration the fact that A, α and β undergo a change in the range of $(1\pm x)$ due to the fabrication variations, the design value of A is determined to satisfy the following relation.

$$A * (1-x) \geq (\alpha+\beta) * (1+x) + |\delta| \qquad \text{Equation 3}$$

Now, a method of designing the resolution S will be explained with reference to FIG. 4. The resolution S is required to be determined for the last-arriving data not to exceed the rear boundary 242 of the clock period even when the data is shifted collectively by the resolution S in the case where the retrieval without fail of the earliest-arriving input to the flip-flops 204 at the intended period 243 ceases to be assured.

The first phase represents the case in which the inputs to the flip-flops 204, 214 and 224 of FIG. 4 are collectively shifted backward slightly so that the fall of the input to the flip-flop 224 coincides with the forward boundary 241 with respect to the flip-flop 224. In this case, the input rise of the flip-flop 214 is located $(\alpha+\beta+|\delta|)$ behind the flip-flop 240. The second phase, on the other hand, concerns the case in which the inputs to the flip-flops 204, 214 and 224 of FIG. 3 are shifted collectively backward until the input rise of the flip-flop 214 coincides with the boundary 242.

The limit of shifting the phase by the variable delay circuit is $(T-(\alpha+\beta+|\delta|))$, and the variable width S may be less than this value. Taking into consideration the fact that the period may assume a minimum value (T–ΔT) due to jitter or the like and that values S, α and β are subject to change in the range $(1\pm x)$ due to the fabrication variations, the design value of S is determined in such a manner as to satisfy the following relation.

$$T \geq (\alpha+\beta+S) * (1+x) + |\delta| + \Delta T \qquad \text{Equation 4}$$

Also, in the case where the upper limit of the design value S is larger than the lower limit of the design value A, the value A may be set equal to S for designing. In other words, the variable delay circuit can be configured in one stage. The condition for this is given from Equations 3 and 4 as $$(T-((\alpha+\beta) * (1+x)+|\delta|+\Delta T)) \div (1+x) \geq ((\alpha+\beta) * (1+x)+|\delta|) \div (1-x) \qquad \text{Equation 5}$$

Although the description of this embodiment shows three signals as the data signals 102, one or more signals may be used as desired. The number of bits for the delay control signal 401, which is shown as four by way of explanation, also depends on the number of switching stages of the variable delay circuit. Also, the number of frequency divisions of the frequency divider 110, which is assumed to be eight, is not limited to such a number according to the invention.

(2) Embodiment 2

Figure 15:
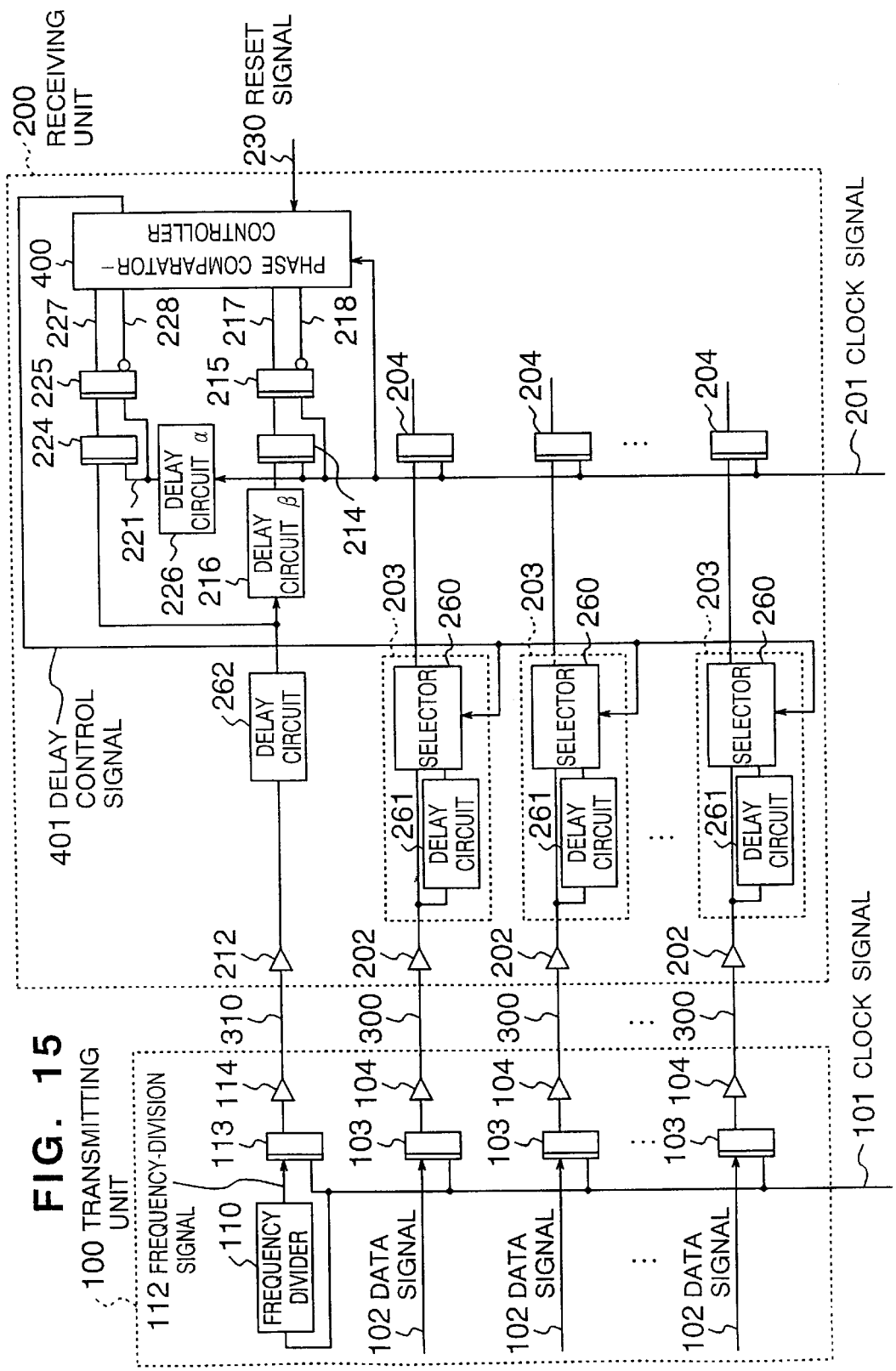
FIG. 15 is a circuit diagram showing another embodiment according to the invention.

FIG. 15 shows another embodiment of the invention. The main difference of the the embodiment of FIG. 15 from the embodiment of FIG. 1, which has a similar configuration, resides in the configuration of the variable delay circuit 203 and the configuration and operation of the phase comparator-controller 400. According to this embodiment, the variable delay circuit 203 having a single switching stage includes a delay circuit 261 and a selector 260. As described above, a variable delay circuit of this configuration can be employed in the case where Equation 5 holds. This circuit selects the signal passed through the delay circuit 261 or the signal not passed through the delay circuit 261 by use of the delay control signal 401. There is only one switching stage and therefore the delay control signal 401 is one bit. The delay circuit 262 is designed in such a manner as to attain a delay time equal to the one obtained when the selector 260 selects the upper signal in the drawing.

Figure 16:
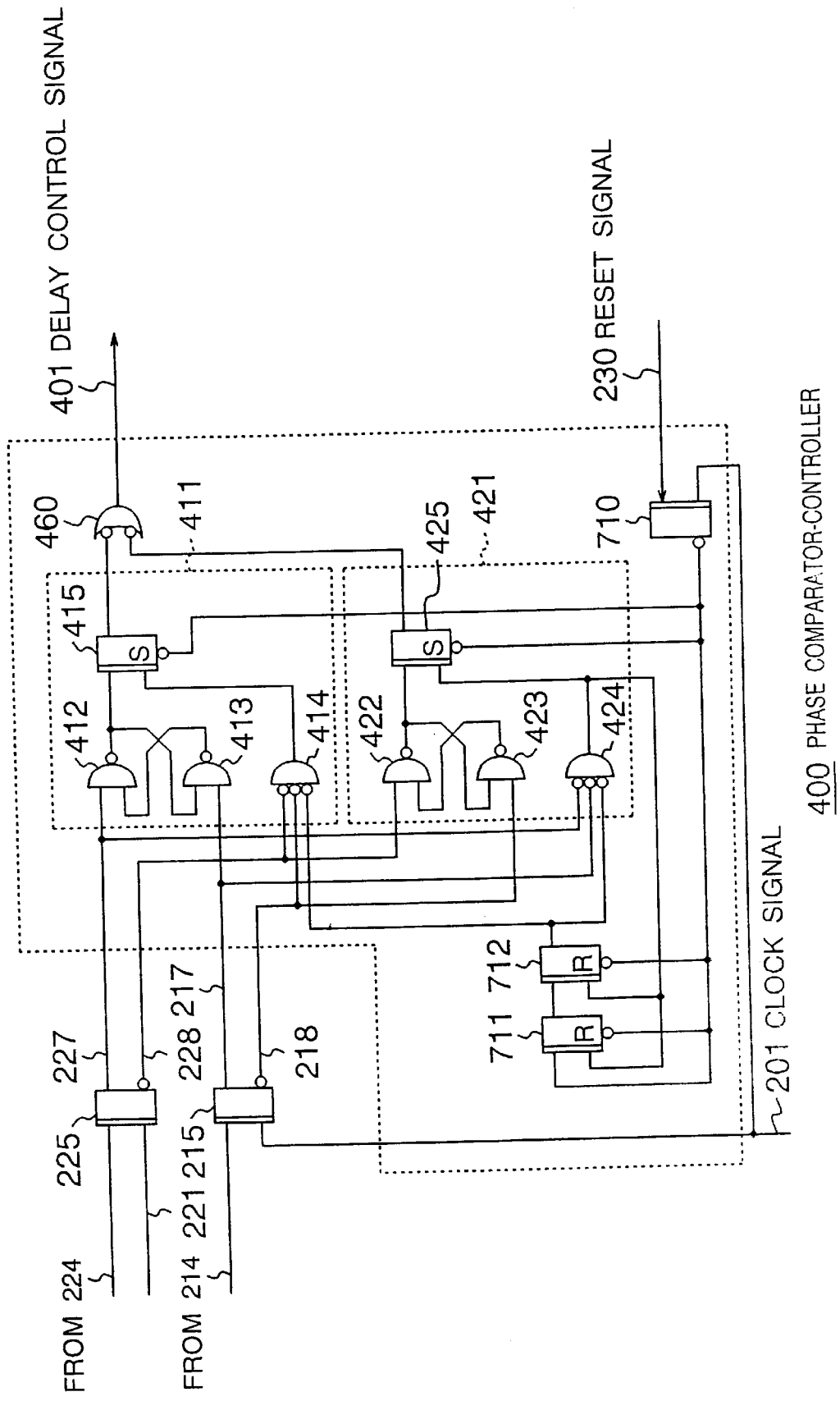
FIG. 16 is a circuit diagram showing a configuration of a phase comparator-controller used for the embodiment of FIG. 15.

FIG. 16 shows a configuration of the phase comparator-controller 400 used for the embodiment under consideration. This configuration has eliminated a part of the functions of the first embodiment and realizes the invention with a simpler configuration. The main difference of this configuration lies in that the DISABLE and READY functions are removed and also in different numbers of phase comparators involved.

A fewer number of phase comparators is employed on the assumption that Case 4 described above dose not occur according to the embodiment and therefore a phase comparator is not required for detecting Case 4. From the description of FIG. 5, the prerequisite for this configuration is given by $$|\delta| \leq \alpha + \beta. \qquad \text{Equation 6}$$

Numerals 415, 425 designate a flip-flop with the set function, and numerals 711, 712 a flip-flop with the reset function.

The operation of the circuit shown in FIG. 16 will be described.

Upon application of the clock signal 201 with the RESET signal at "H" level, the "L" output of the flip-flop 710 is applied to the flip-flops 415, 425, 711 and 712, so that the outputs of the flip-flops 711 and 712 assume "L" and the outputs of the flip-flops 415 and 425 "H".

When the RESET signal turns to "L", the phase comparators 411 and 421 perform phase comparison as in the first embodiment as long as the output of the flip-flop 712 remains "L", and upon detection of an error, outputs an "L", which acts to invert the delay control signal 401 through the gate circuit 460. The signal compared in this embodiment is one corresponding to the case in which the selector has selected the shorter delay time regardless of the condition of the delay control signal, and the result of comparison is appropriately held.

The flip-flops 711 and 712 are adapted to retrieve data in step with the rise of the NOR 424. When at least one of the comparator inputs 227 and 217 is reduced from "H" to "L", the output of the NOR 424 turns from "L" to "H", so that the flip-flop 711 retrieves the output "H" of the flip-flop 710. Further, the comparator inputs 227 and 217 assume "H". Upon subsequent turning to state "L", the output of the NOR 424 assumes "L" followed by state "H" again, with the result that the flip-flop 712 retrieves the output "H" of the flip-flop 711. After that, the outputs of the NORs 414 and 424 hold "L", and therefore the outputs of the flip-flops 415 and 425 cease to change.

Meanwhile, the phase comparator 421 performs the phase comparison operation twice and the phase comparator 411 performs such operation at least once. The error detection for Cases 2, 3 and 5 thus is possible as described with reference to the first embodiment. In the case where no error is detected by the last phase comparison effected by the phase comparators 411 and 421, it is decided that normal communication is possible with the shorter delay time of the variable delay circuit, and the delay control signal 401 turns ready to select the shorter delay time. In the case where an error is detected by at least one of the phase comparisons, on the other hand, it is decided that the delay control signal 401 can be transmitted normally with a longer delay time of the variable delay circuit, so that the delay control signal 401 is ready to select the longer delay time.

(3) Embodiment 3

Figure 17:
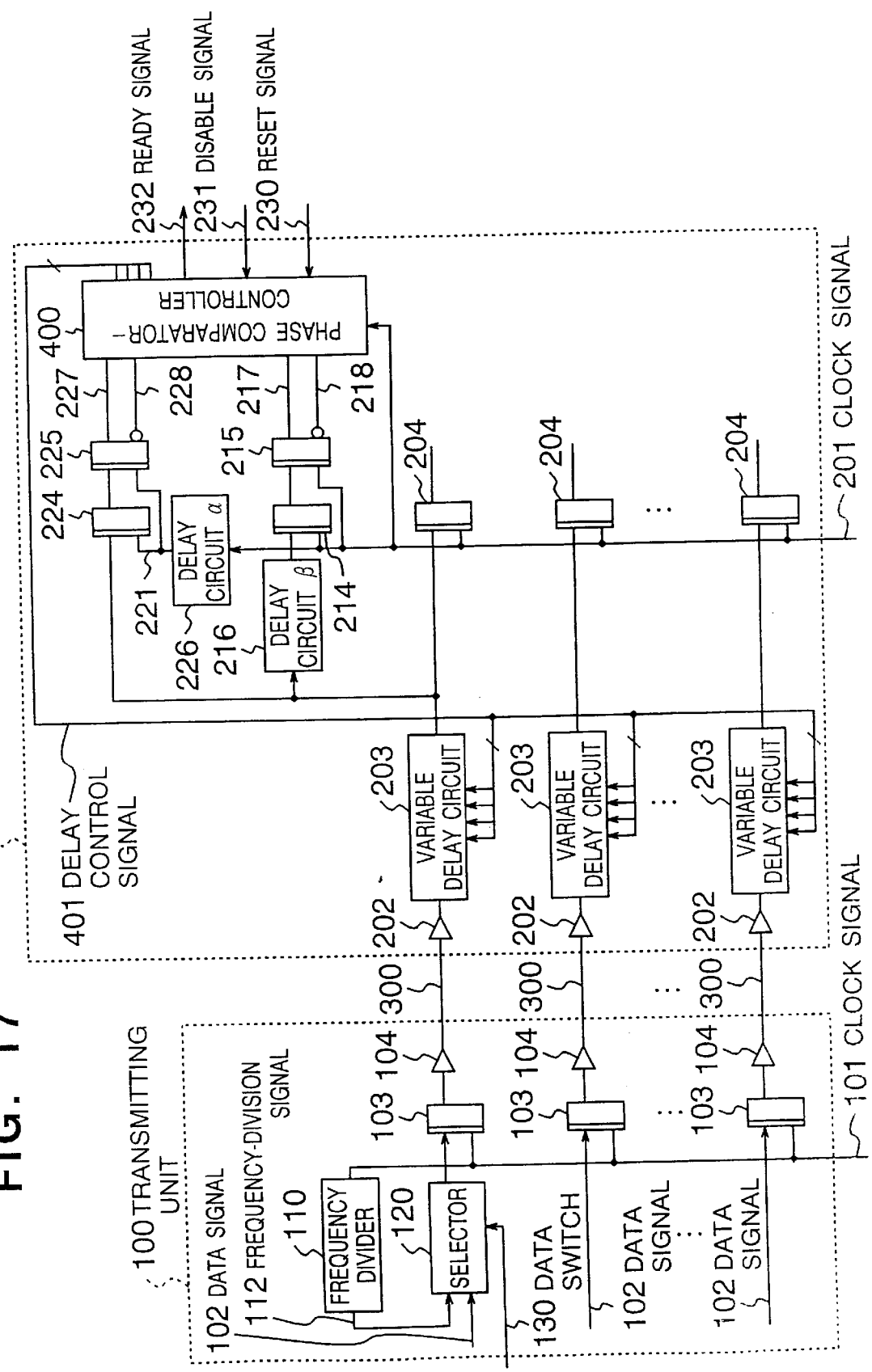
FIG. 17 is a circuit diagram showing another embodiment according to the invention.

Still another embodiment of the invention is shown in FIG. 17. The main difference of this embodiment with the first embodiment lies in that the path for transmitting the frequency-division signal 112 used for phase comparison is shared as one of the paths for transmitting the data signals 102, whereby the signal communication paths can be reduced.

In setting the delay time for the variable delay circuit 203, the selector 120 selects the frequency division signal 112 and applies it to the flip-flop 103. When the READY signal assumes "H" after complete setting, a data switching signal 130 is changed so that the selector 120 selects the data signal 102.

(4) Embodiment 4

Figure 18:
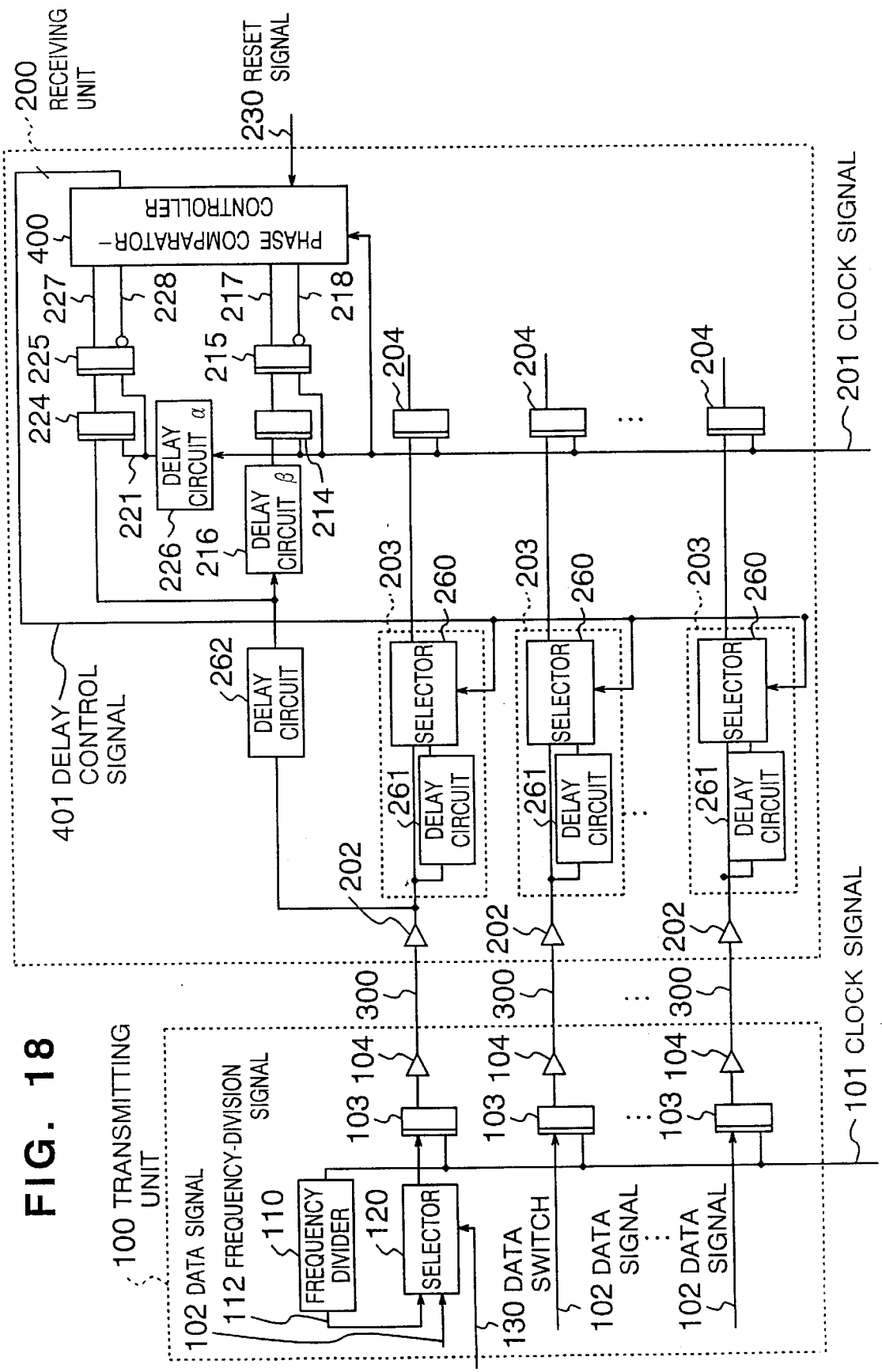
FIG. 18 is a circuit diagram showing still another embodiment according to the invention.

A further embodiment of the invention is shown in FIG. 18. This embodiment represents a case in which the path for transmitting the frequency division signal 112 used for phase comparison is shared as one of the paths for transmitting the data signals 102.

(5) Embodiment 5

Figure 19:
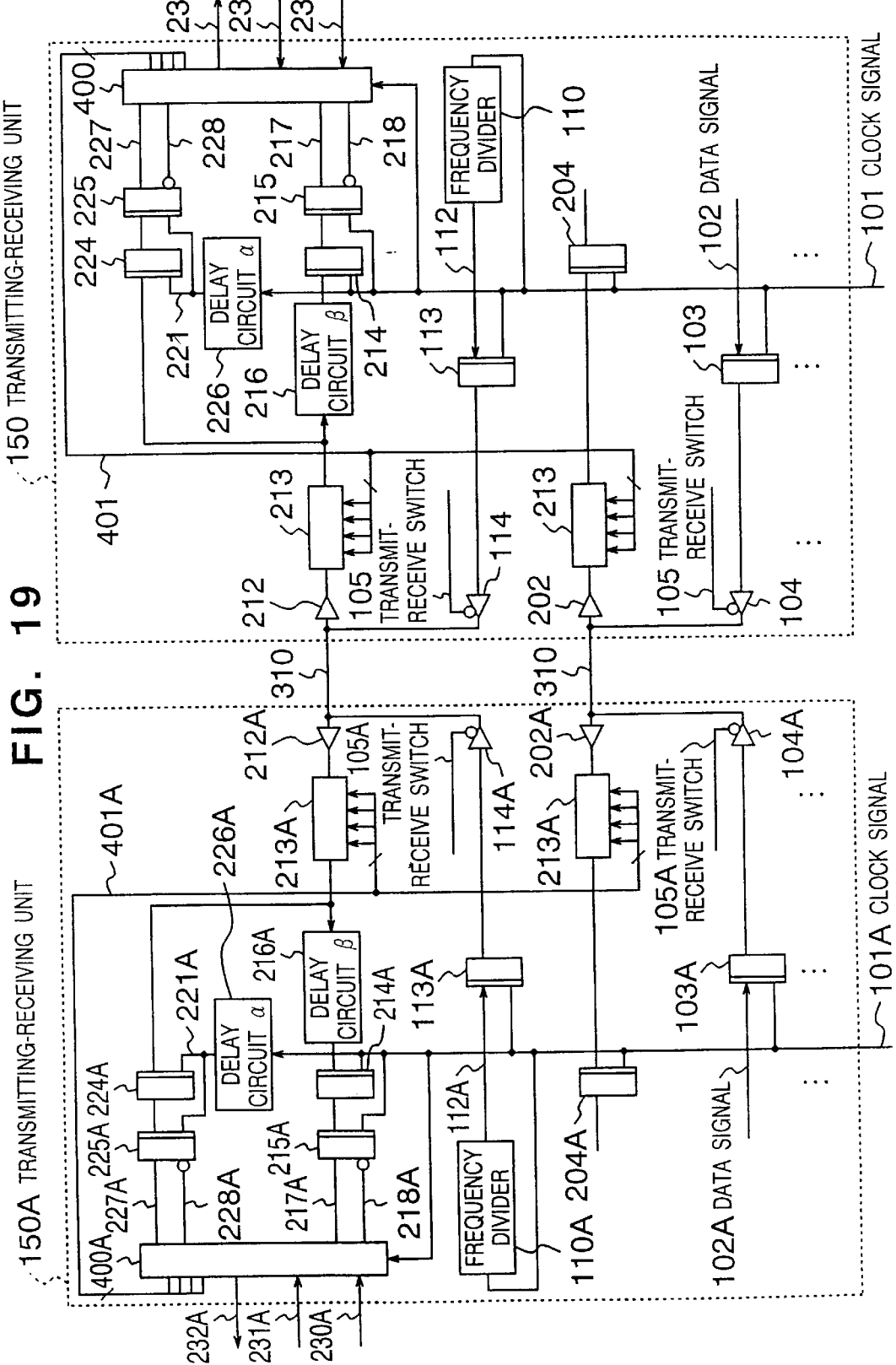
FIG. 19 is a circuit diagram showing a further embodiment according to the invention.

A still further embodiment of the invention is shown in FIG. 19. The main difference of this embodiment with other embodiments resides in that a plurality of units capable of transmission and receiving are connected using a bidirectional buffer and signals are mutually transmitted and received using the same communication path.

Numeral 150 designates a transmitting-receiving unit operated in accordance with the clock signal 101, and numeral 150A a transmitting-receiving unit operated according to the clock signal 101A.

The delay time for the variable delay circuit of the transmitting-receiving units 150 and 150A is set in the manner described below, for example.

A unit for controlling the whole system determines the transmission-receiving switching signal 105 or 105A as an effective signal. The following explanation is based on the assumption that the delay time of the variable delay circuit of the transmitting-receiving unit 150 is determined first.

First, the transmission-receiving switching signal 105A permits effective transmission, and the frequency division signal 112A is sent to the transmitting-receiving unit 150 through a buffer 114A and a communication path 310. The transmitting-receiving unit 150 sets the delay time of the variable delay circuit using the signal thus sent, and outputs the READY signal 232. Then, the unit for controlling the whole system changes the transmission-receiving switching signal 105A, and then changes the transmission-receiving switching signal 105. The frequency division signal 112 is sent to the transmitting-receiving unit 150A through the buffer 114 and the communication path 310. The transmitting-receiving unit 150A sets the delay time of the variable delay circuit using the signal thus sent and outputs the READY signal 232A. The transmission and receiving of signals is subsequently performed correctly between the transmitting-receiving units 150 and 150A.

Although the embodiment under consideration represents a configuration capable of bidirectional communication by modifying a part of the configuration of the first embodiment, a configuration capable of bidirectional communication is realizable with any of the above-mentioned embodiments.

Further, the present embodiment is applicable to the case having three or more transmitting-receiving units.

(6) Embodiment 6

Figure 20:
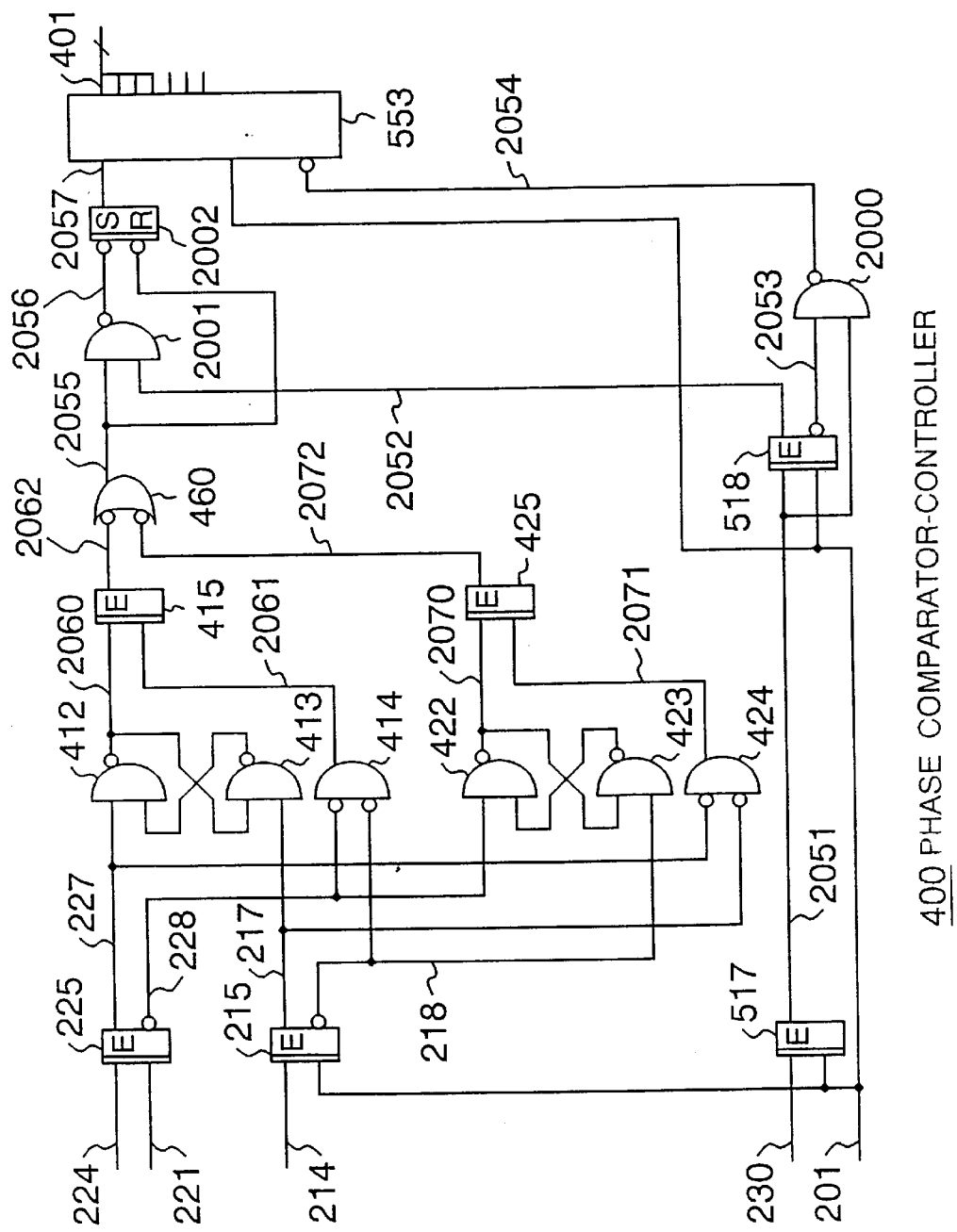
FIG. 20 is a circuit diagram showing another configuration of the phase comparator-controller used for the embodiment of FIG. 1.

Now, another embodiment of the phase comparator-controller 400 shown in FIG. 6 will be described. FIG. 20 is a circuit diagram showing the embodiment. In FIG. 20, numerals 2000, 2001 designate NAND circuits, and numeral 2002 an S-R flip-flop. The remaining component parts of the configuration are substantially the same as the corresponding ones in FIG. 6. The three least significant bits of the counter circuit 553 are not used, only most significant several bits are used as a delay control signal 401. The main difference between the configuration of FIG. 20 and that of FIG. 6 is that the DISABLE 231 signal and READY signal 232 are eliminated and only the RESET signal 230 is used for control and that the component parts 431 and 441 of the phase comparator section 410 and the flip-flops 451 to 454 are eliminated.

Figure 21:
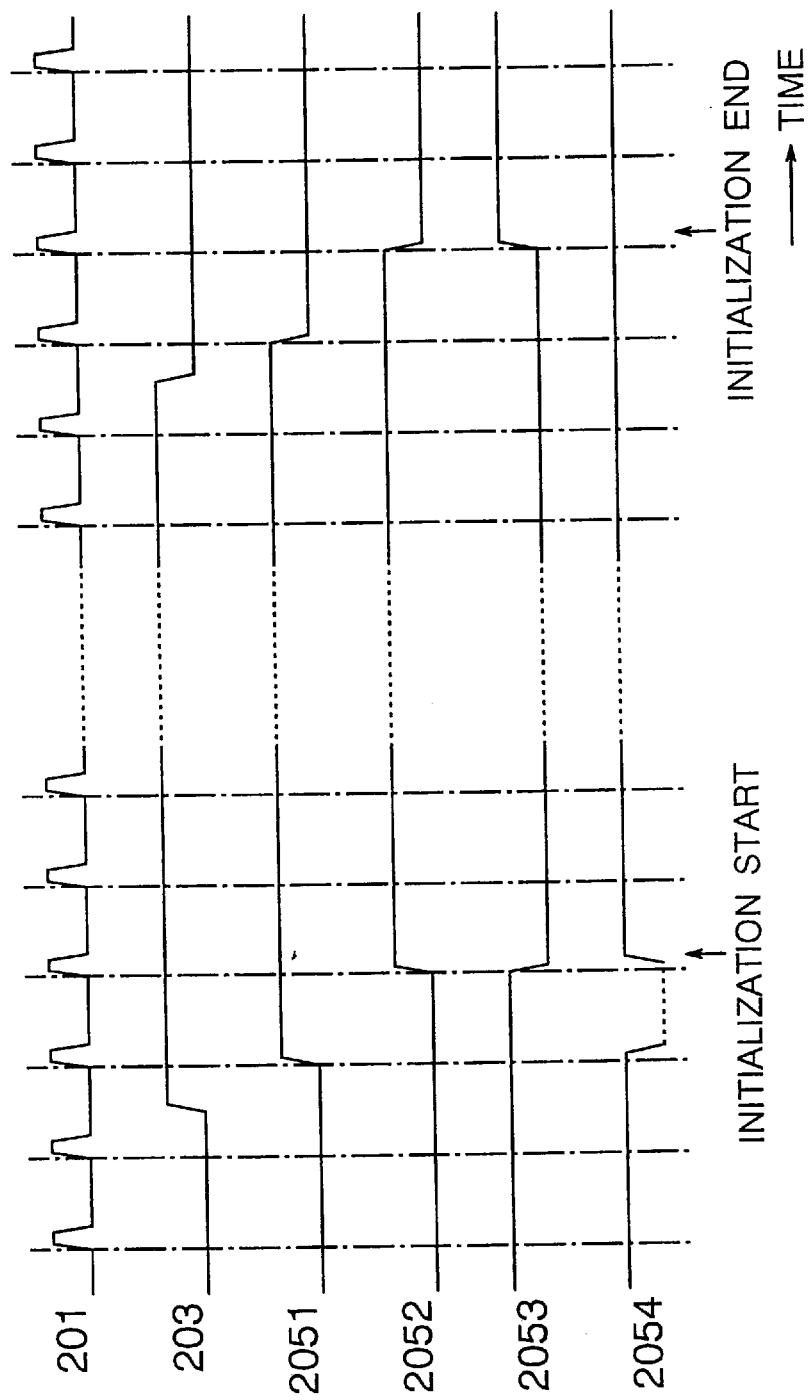
FIG. 21 is a diagram showing an example timing chart representing the operation of the phase comparator-controller of FIG. 20.

An example timing chart for explaining the operation of the controller section of the circuit of FIG. 20 is shown in FIG. 21. In FIG. 21, numerals 201 to 2054 designate voltage changes of the signals designated by the same numerals respectively in FIG. 20. The reset signal 230 in the circuit of FIG. 20, as shown in FIG. 21, is changed in such a manner as to rise to "H" from "L" level at a certain time and falls a predetermined time later. Initialization is started about two cycles after the rise of this signal, and finished about two cycles after the fall thereof. Specifically, the cycle immediately following a rise of the reset signal 230 sees the signal 2051 become "H", the signal 2054 reduced to "L" and the counter 53 reset. In the next cycle, the signal 2054 becomes "H", the reset condition of the counter 553 is cancelled, and the signal 2052 is raised to "H". If the output 2055 of the NAND circuit 460 is "H" at this time point, the ENABLE signal 2057 for the counter 553 rises to "H", so that the count is incremented for each cycle. In view of the fact that only the most significant bits except for the three least significant bits of the counter 553 are used as the delay control signal 401, the delay control signal 401 is incremented one step for each eight cycles, and therefore the delay time of the variable delay circuits 203 and 213 is incremented one step for each eight cycles. When the flip-flops 214 and 224 come to retrieve a frequency-division signal in the same cycle with the signal 2055 reduced to "L", or in the case where the signal 2055 is "L" from the beginning, the ENABLE signal 2057 of the counter 553 is reduced to "L" and the prevailing count is held. Two cycles after the reset signal 230 is reduced to "L", the signal 2052 is also reduced, and the ENABLE signal 2057 of the counter 553 subsequently fails to rise. The reset signal 230 thus rises only after the source voltage and temperature are settled following power on, and falls after maintaining "H" for a longer duration than the period of the noise generated in the system. The flip-flop 2002 is provided with the intention that in the case where the signal 2055 rises to "H" immediately before the end of initialization with the delay control signal 401 beginning to increment, the initialization is continued until the signal 2055 is reduced to "L" again.

The components parts 431 and 441 and the flip-flops 451 to 454 in the circuit of FIG. 6 are eliminated from the circuit of FIG. 20. These component parts can be eliminated in the case where the condition of Equation 6 holds as explained above with reference to FIG. 16. In other words, in the case where the condition of Equation 6 holds, Case 4 shown in FIG. 5 never occurs and therefore the the component parts for detecting Case 4 are not needed.

(7) Embodiment 7

Figure 22:
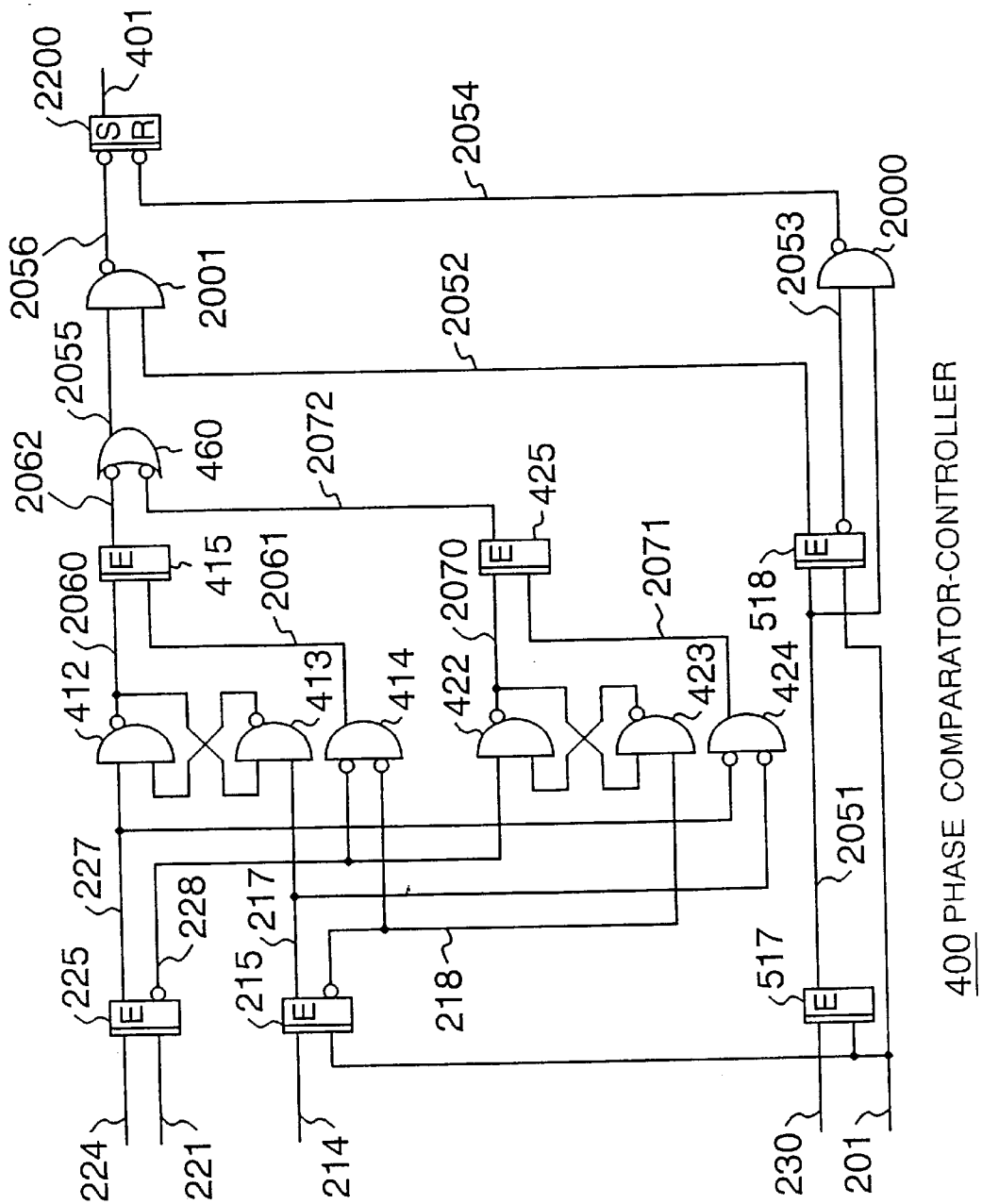
FIG. 22 is a circuit diagram showing another configuration of the phase comparator-controller used for the embodiment of FIG. 15.

Now, another embodiment of the phase comparator-controller 400 shown in FIG. 16 will be explained. FIG. 22 shows a circuit diagram of the embodiment. In FIG. 22, numeral 2200 designates an S-R flip-flop. The remaining component parts are substantially the same as the corresponding parts in FIG. 20. With reference to the circuit of FIG. 22, as in the circuit of FIG. 20, the RESET signal 230 rises only after the source voltage and temperature are settled after power on, and falls only after keeping "H" for a longer duration than the period of the internal noise of the system. The next cycle following the rise of the reset signal 230 sees the flip-flop 2200 reset. If the signal 2055 is raised to "H" at least once during the subsequent time length when the signal 2052 is "H", the delay control signal 401 becomes "H". In the case where the signal 2055 fails to rise to "H" even once while the signal 2052 remains "H", on the other hand, the delay control signal 401 remains "L". After the fall of the RESET signal, the prevailing delay control signal 401 is held. In the phase comparator-controller shown in FIG. 16, the delay control signal 401 is determined only by the result of phase comparison made once immediately after each initialization with respect to the rise and fall of the frequency-division signal 112. With the circuit of FIG. 22, in contrast, the delay control signal 401 is determined by a plurality of phase comparisons made during the time when the RESET signal 230 maintains "H" level. It is therefore necessary to make decision with a sufficient accuracy to accommodate the phase drift which may occur due to the noise generated during the comparison operation. The values $\alpha$ and $\beta$ can thus be set lower than in the case of FIG. 16.

(8) Embodiment 8

Figure 23:
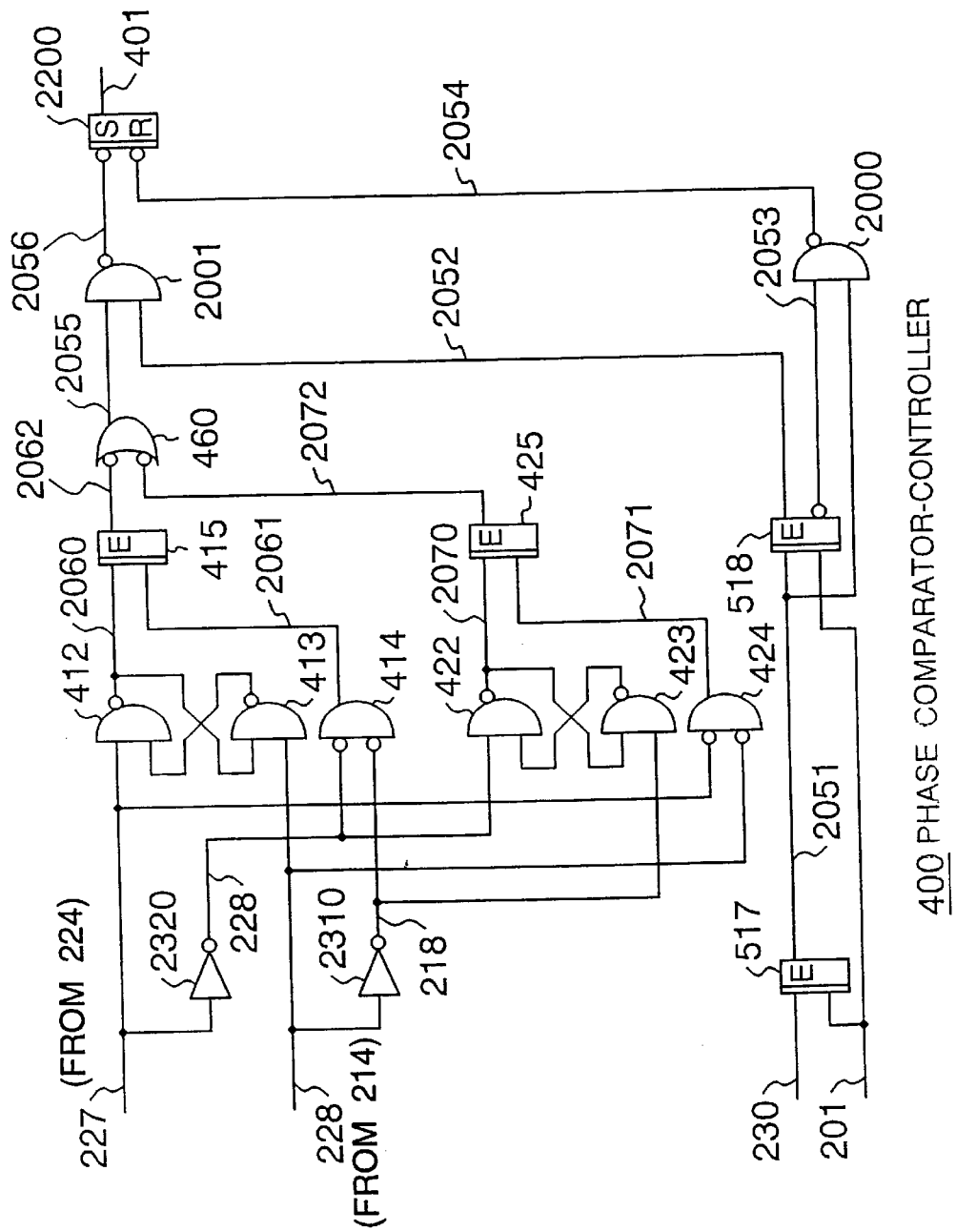
FIG. 23 is a circuit diagram showing still another configuration of a phase comparator-controller used for the embodiment of FIG. 15.

FIG. 23 is a circuit diagram showing the phase comparator-controller 400 of FIG. 22 according to still another embodiment. This embodiment has a configuration eliminating the flip-flops 215 and 225 used for preventing the propagation to the following stages of a hazard which may be caused by the flip-flop 214 or 224. The case where the flip-flop 214 causes a hazard is a state in the boundary between Case 1 and Case 2, while the flip-flop 224 produces a hazard in the boundary between Case 1 and Case 3. In such cases, the flip-flop 204 should retrieve data correctly regardless of which path is selected by the selector 260 of FIG. 15. The delay control circuit 401 therefore may be fixed at any level. Especially when flip-flops 415 and 425 for holding the result of phase comparison are provided independently of a flip-flop 2200 for holding the delay control signal 401, the flip-flops 215 and 225 are considered substantially unnecessary.

(9) Embodiment 9

Figure 24:
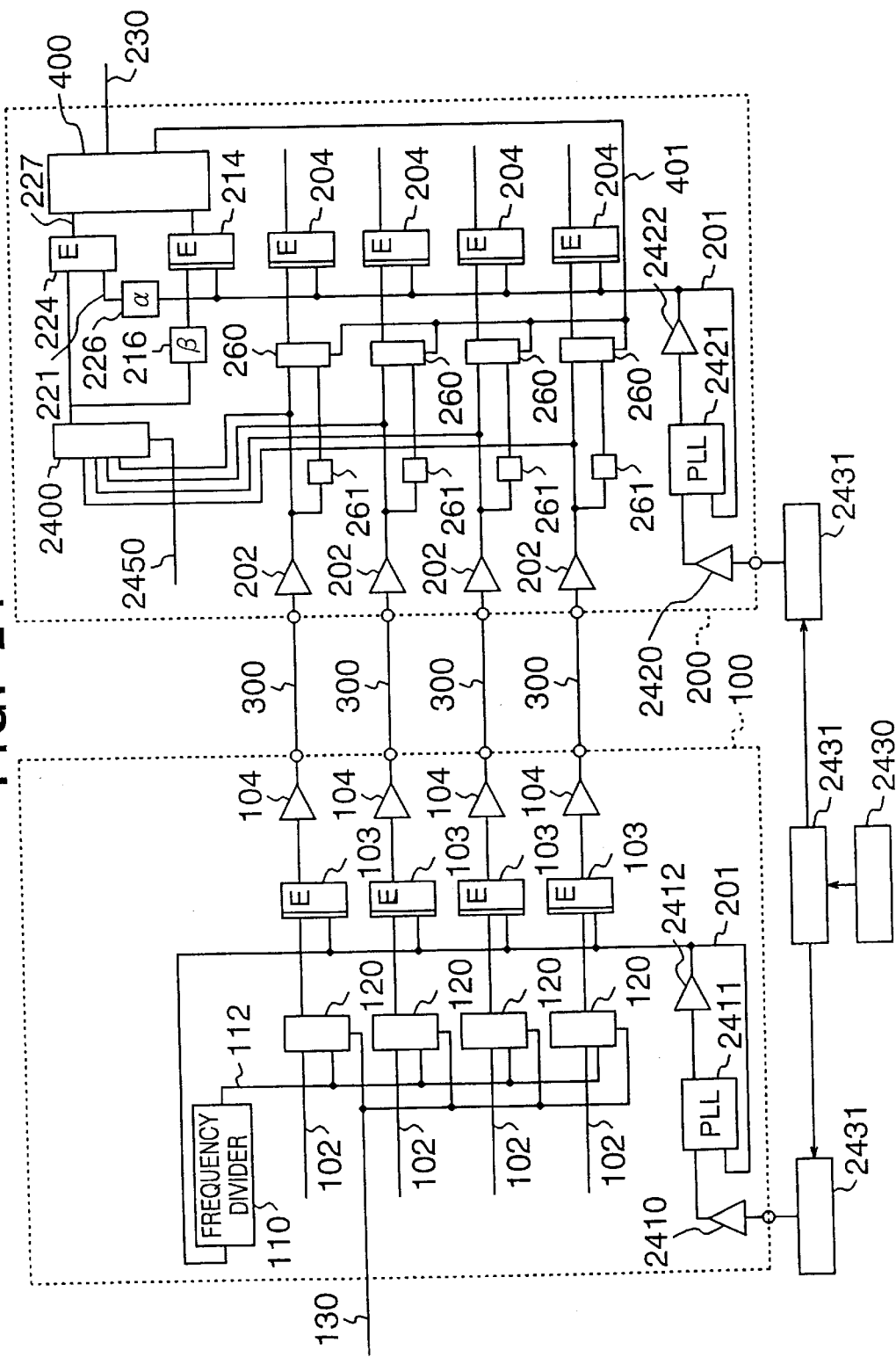
FIG. 24 is a circuit diagram showing a still further embodiment according to the invention.

A yet further embodiment of the invention is shown in FIG. 24. The embodiment of FIG. 24, which is another modification of the embodiment of FIG. 18, is so configured that the frequency-division signal communication path 310 doubles as the data signal communication path 300 for all bits in the data signal communication path 300. In FIG. 24, numeral 2400 designates a selector, and numeral 2450 a signal for switching the selector 2400. An example method for supplying the clock signals 101 and 201 is also shown in FIG. 24. In FIG. 24, numeral 2430 designates an oscillation circuit for generating a clock signal providing a seed for the clock signals 101 and 201, and numeral 2431 a buffer circuit for distributing the clock signals to the transmitting unit 100 and the receiving unit 200. The oscillation circuit 2430 and the buffer circuit 2431 can be configured in separate LSIs respectively, or some parts of the two circuits can be contained in a single LSI. Numerals 2410 and 2420 designate input buffer circuits for retrieving the clock signal supplied from the buffer circuit 2431 into the LSI making up the transmitting unit 100 or the receiving unit 200 respectively. Numerals 2411 and 2421 designate PLL circuits for generating a clock signal of a predetermined frequency on the basis of the clock signals described above, and numerals 2412 and 2422 buffer circuits for distributing the clock signals to a multiplicity of circuits in the LSI making up the transmitting unit 100 or the receiving unit 200 respectively.

The signal 2450 is generated by frequency-dividing the clock signal 201, for example. The selector 2400 switches all the bits of the data signal sequentially selectively. As a result, decision is made by the phase comparator-controller with respect to all the bits in the data signal path. It is thus possible to make a decision of higher accuracy excluding the error due to delay time variations for each bit in the data signal path, thereby making it possible to set the values $\alpha$ and $\beta$ smaller than in the case of FIG. 15 or 18.

(10) Embodiment 10

Figure 25:
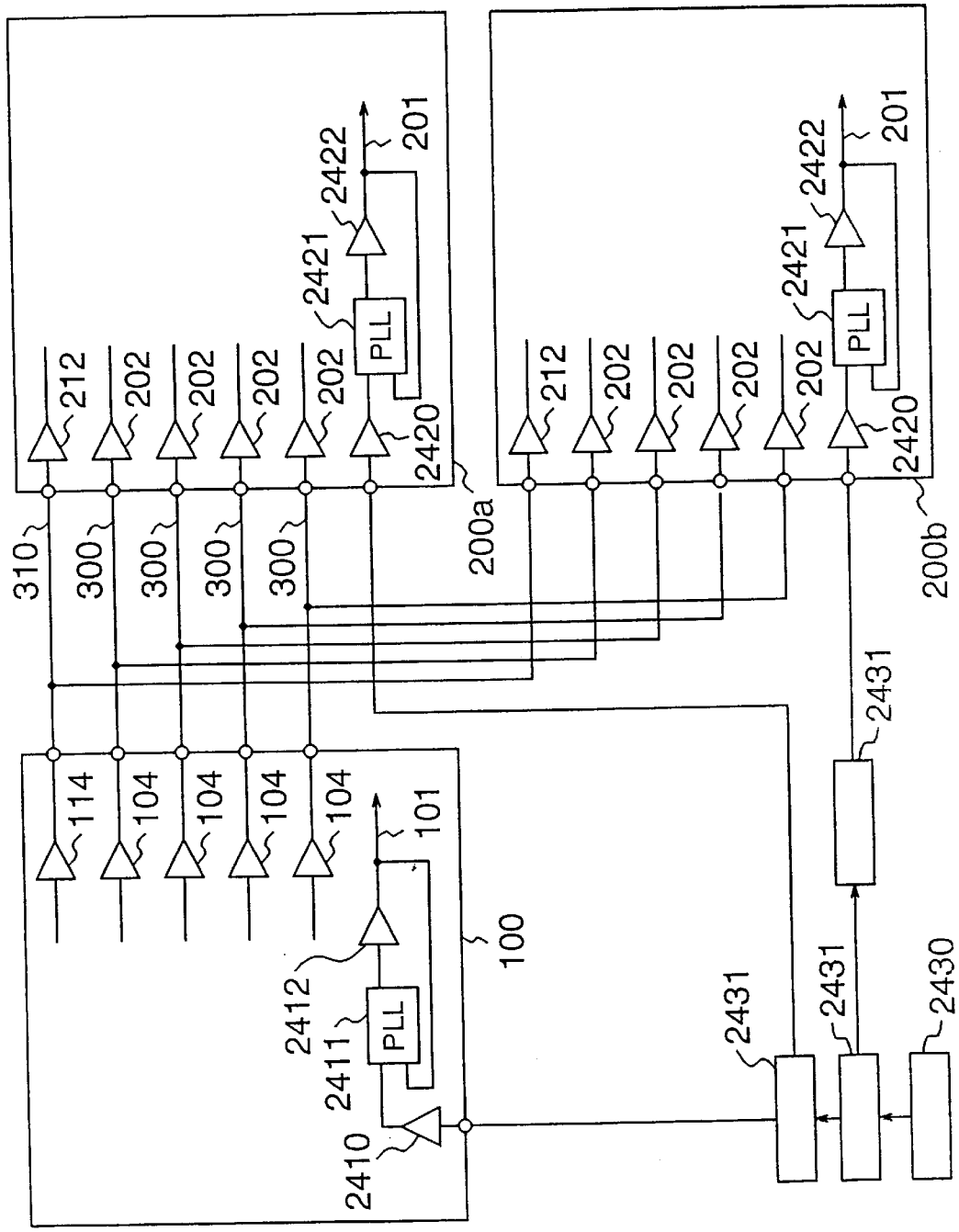
FIG. 25 is a circuit diagram showing a yet further embodiment according to the invention.

A yet further embodiment of the invention is shown in FIG. 25. The embodiment of FIG. 25 represents a case in which a plurality of receiving units 200a and 200b are provided with respect to a single transmitting unit 100 in the embodiment of FIG. 1 or 15. In FIG. 25, although a part of the internal circuits of the transmitting unit 100 and the receiving units 200a and 200b is not shown, the configuration is the same as that of the transmitting unit 100 and the receiving unit 200 respectively shown in FIG. 1 or 15. As shown in FIG. 25, in the case where a signal is transmitted to a plurality of receiving units, the propagation time for transmitting the data signal from the transmitting unit 100 to the receiving unit 200a need not be made to coincide with the propagation time for transmitting the data signal from the transmitting unit 100 to the receiving unit 200b. According to this embodiment, phase adjustment is possible for each receiving unit. Also, the configuration including a plurality of receiving units is applicable to the embodiments of FIGS. 17 to 19 and 24.

(11) Embodiment 11

Figure 26:
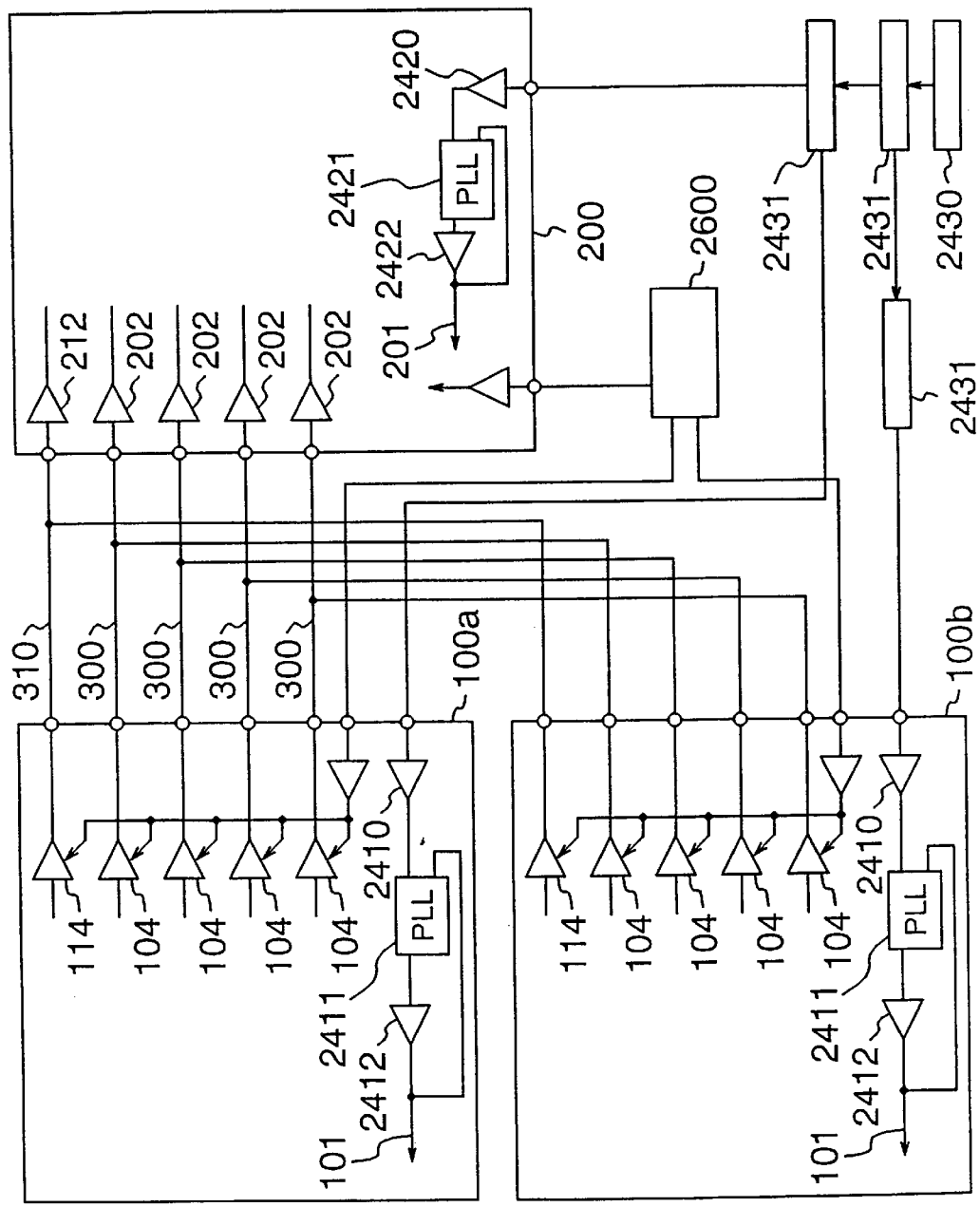
FIG. 26 is a circuit diagram showing a yet further embodiment according to the invention.

A still further embodiment of the invention is shown in FIG. 26. The embodiment of FIG. 26 represents a case in which a plurality of transmitting units 100a and 100b are provided for a single receiving unit 200 in the embodiment of FIG. 1 or 15. In FIG. 26, numeral 2600 designates a control circuit for determining which of the transmitting units is to produce a signal in each particular prevailing situation. This circuit may be arranged externally to each unit as shown in FIG. 26, or in any of the transmitting units 100a and 100b and the receiving unit 200, as desired. The output buffers 104 and 114 arranged in the transmitting units 100a and 100b are controllable by an ENABLE terminal as in the embodiment of FIG. 19. According to this embodiment, initialization is performed first between the transmitting unit 100a and the receiving unit 200 in the same manner as in the embodiment of FIG. 1 or 15. After the delay control signal 401 involved is stored in the receiving unit 200, initialization is effected between the transmitting unit 100b and the receiving unit 200 in the same manner as the initialization of the embodiment of FIG. 1 or 15. The delay control signal 401 prevailing in that particular situation is also stored in the receiving unit 200. Actual data transmission uses the delay control signal 401 corresponding to the particular transmitting unit involved each time. In FIG. 26, the internal circuits of the transmitting units 100a and 100b and the receiving unit 200 are partially not shown. The configuration, however, is substantially the same as that of the transmitting unit 100 and the receiving unit 200 of FIG. 1 or 15 respectively except for the parts described above. Also, according to this embodiment, the signal propagation time from the transmitting unit 100a to the receiving unit 200 need not be identical to the signal propagation time from the transmitting unit 100b to the receiving unit 200. Phase adjustment is possible for each transmitting unit according to the invention. The configuration including a plurality of receiving units is applicable also to the embodiments of FIGS. 17 to 19, 24 and 25.

It will thus be understood from the foregoing description that according to the present invention data can be transmitted and received correctly without a piggyback signal between circuits operated with clocks of equal frequency but different phases, and therefore a high-performance information processing system is realized with a shorter clock period.

We claim:

1. An information processing system comprising:
   a first circuit for outputting a first digital signal in synchronism with a first clock;
   a plurality of second circuits for outputting a second digital signal in synchronism with said first clock;
   a third circuit for retrieving said first digital signal in synchronism with a second clock of the same frequency as said first clock;
   a plurality of fourth circuits for retrieving said second digital signal in synchronism with said second clock of the same frequency as said first clock;
   a first signal communication path for transmitting said first digital signal from said first circuit to said third circuit;
   a plurality of second signal communication paths for transmitting said second digital signal from said second circuits to said fourth circuits;
   a fifth circuit for retrieving said first digital signal at a timing different from said third circuit in response to said second clock signal;
   a plurality of sixth circuits for changing the propagation time of said second signal communication path in two states of propagation time; and
   a seventh circuit for comparing the digital signal retrieved by said third circuit and the digital signal retrieved by said fifth circuit and controlling said sixth circuits according to the result of comparison.

2. An information processing system according to claim 1, further comprising:
   a signal generating circuit for generating said first digital signal which changes in a predetermined manner and applying said first digital signal to said first circuit.

3. An information processing system according to claim 2, wherein said signal generating circuit generates said first digital signal by frequency-dividing said first clock.

4. An information processing circuit according to claim 2 wherein said seventh circuit controls said sixth circuits in such a manner as not to change the propagation time when said third and fifth circuits have retrieved the same signal, and controls said sixth circuits in such a manner as to change the propagation time when said third and fifth circuits have retrieved different signals.

5. An information processing system according to claim 4 wherein said seventh circuit decides whether to control said sixth circuits according to an external signal applied to said seventh circuit.

6. An information processing system according to claim 5 wherein said seventh circuit controls said sixth circuits when said external signal is a signal for initializing the information processing system.

\* \* \* \* \*